United States Patent
Park et al.

(10) Patent No.: US 11,090,899 B2
(45) Date of Patent: Aug. 17, 2021

(54) PREPREGS, CORES AND COMPOSITE ARTICLES INCLUDING POWDER COATED LAYERS

(71) Applicants: Yune Seo Park, Fenton, MI (US); Shriram Joshi, Lynchburg, VA (US); Hong Xu, Lynchburg, VA (US); Mark O Mason, Covington, VA (US); Anthony J Messina, Macomb, MI (US)

(72) Inventors: Yune Seo Park, Fenton, MI (US); Shriram Joshi, Lynchburg, VA (US); Hong Xu, Lynchburg, VA (US); Mark O Mason, Covington, VA (US); Anthony J Messina, Macomb, MI (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 15/605,059

(22) Filed: May 25, 2017

(65) Prior Publication Data

US 2018/0015688 A1    Jan. 18, 2018

Related U.S. Application Data

(60) Provisional application No. 62/341,989, filed on May 26, 2016.

(51) Int. Cl.
*B32B 5/18* (2006.01)
*B32B 5/02* (2006.01)
(Continued)

(52) U.S. Cl.
CPC .................. *B32B 5/18* (2013.01); *B32B 5/02* (2013.01); *B32B 5/022* (2013.01); *B32B 5/024* (2013.01);
(Continued)

(58) Field of Classification Search
CPC ........... B32B 5/18; B32B 5/022; B32B 5/024; B32B 5/028; B32B 27/065; B32B 27/08; B32B 2255/20; B32B 2255/26
See application file for complete search history.

(56) References Cited

U.S. PATENT DOCUMENTS 5,057,353 A * 10/1991 Maranci .................... B32B 5/28
                                                          428/147
6,429,157 B1 * 8/2002 Kishi ....................... B32B 5/022
                                                          442/227
(Continued)

FOREIGN PATENT DOCUMENTS

EP        1090973        4/2001
JP        H06255014      9/1994
(Continued)

OTHER PUBLICATIONS

English translation to JP 2004-107605 A (Araki et al.) obtained from European Patent Office website. (Year: 2004).*
(Continued)

*Primary Examiner* — Jeremy R Pierce
(74) *Attorney, Agent, or Firm* — Rhodes IP PLC; Christopher Rhodes

(57) ABSTRACT

Composite articles comprising a porous prepreg or core layer and a powder coated layer thereon are described. In some instances, a thermoplastic composite article comprises a porous core layer comprising a web of reinforcing fibers held together by a thermoplastic material, and a powder coated layer disposed on the porous core layer, in which a particle size of the powder coated layer is selected to provide an interface between the powder coated layer and the porous core layer, wherein at least 50% by weight of the disposed powder coated layer is present above the interface.

15 Claims, 17 Drawing Sheets

(51) Int. Cl.
| | |
|---|---|
| *B32B 27/06* | (2006.01) |
| *B32B 27/08* | (2006.01) |
| *B32B 27/10* | (2006.01) |
| *B32B 27/28* | (2006.01) |
| *B32B 25/16* | (2006.01) |
| *B32B 7/12* | (2006.01) |
| *B32B 27/12* | (2006.01) |
| *B32B 25/20* | (2006.01) |
| *B32B 27/36* | (2006.01) |
| *B32B 25/04* | (2006.01) |
| *B32B 27/32* | (2006.01) |
| *B32B 27/30* | (2006.01) |
| *B32B 25/10* | (2006.01) |
| *B32B 37/00* | (2006.01) |
| *B32B 27/34* | (2006.01) |
| *B32B 25/08* | (2006.01) |
| *B32B 7/04* | (2019.01) |
| *B32B 37/08* | (2006.01) |
| *B32B 37/12* | (2006.01) |
| *C08J 7/04* | (2020.01) |
| *C08J 7/043* | (2020.01) |
| *C08J 7/05* | (2020.01) |
| *B32B 37/24* | (2006.01) |
| *B32B 38/04* | (2006.01) |

(52) U.S. Cl.
CPC ............... *B32B 5/028* (2013.01); *B32B 7/04* (2013.01); *B32B 7/12* (2013.01); *B32B 25/045* (2013.01); *B32B 25/08* (2013.01); *B32B 25/10* (2013.01); *B32B 25/16* (2013.01); *B32B 25/20* (2013.01); *B32B 27/065* (2013.01); *B32B 27/08* (2013.01); *B32B 27/10* (2013.01); *B32B 27/12* (2013.01); *B32B 27/28* (2013.01); *B32B 27/281* (2013.01); *B32B 27/285* (2013.01); *B32B 27/286* (2013.01); *B32B 27/302* (2013.01); *B32B 27/304* (2013.01); *B32B 27/32* (2013.01); *B32B 27/34* (2013.01); *B32B 27/36* (2013.01); *B32B 27/365* (2013.01); *B32B 37/0007* (2013.01); *B32B 37/08* (2013.01); *B32B 37/12* (2013.01); *C08J 7/043* (2020.01); *C08J 7/0427* (2020.01); *C08J 7/05* (2020.01); *B32B 37/24* (2013.01); *B32B 2037/1215* (2013.01); *B32B 2038/047* (2013.01); *B32B 2255/10* (2013.01); *B32B 2255/20* (2013.01); *B32B 2255/26* (2013.01); *B32B 2262/101* (2013.01); *B32B 2305/026* (2013.01); *B32B 2305/07* (2013.01); *B32B 2605/003* (2013.01); *C08J 2300/22* (2013.01); *C08J 2423/12* (2013.01); *C08J 2475/04* (2013.01); *C08J 2477/00* (2013.01)

(56) References Cited

U.S. PATENT DOCUMENTS

| | | |
|---|---|---|
| 8,491,754 B2 | 7/2013 | Araki |
| 8,721,943 B2 | 5/2014 | Moore |
| 8,834,759 B2 | 9/2014 | Lalouch |
| 2004/0077247 A1 | 4/2004 | Schmidt |
| 2013/0292076 A1* | 11/2013 | Raghavendran .......... B32B 5/28 162/145 |
| 2014/0087178 A1* | 3/2014 | Arai ........................ B32B 5/26 428/327 |
| 2015/0099411 A1* | 4/2015 | Yang ..................... B32B 5/028 442/1 |
| 2015/0284910 A1 | 10/2015 | Azdel |
| 2016/0332675 A1 | 11/2016 | Yang |
| 2017/0034549 A1 | 2/2017 | Good |
| 2018/0162107 A1 | 6/2018 | Xu |

FOREIGN PATENT DOCUMENTS

| | | |
|---|---|---|
| JP | 2004107605 | 4/2004 |
| JP | 2014069403 | 4/2014 |
| JP | 5898873 | 4/2016 |
| WO | 2015007862 | 1/2015 |
| WO | 2015041912 A2 | 3/2015 |
| WO | 2016069705 | 5/2016 |

OTHER PUBLICATIONS

ISR/WO for PCT/US2017/34426 dated Oct. 20, 2017.
Extended European Search Report for EP17803566 dated Dec. 11, 2019.

* cited by examiner

PREPREGS, CORES AND COMPOSITE ARTICLES INCLUDING POWDER COATED LAYERS

PRIORITY APPLICATION

This application is related to, and claims priority to and the benefit of, U.S. Provisional Application No. 62/341,989 filed on May 26, 2016, the entire disclosure of which is hereby incorporated herein by reference for all purposes.

TECHNOLOGICAL FIELD

This application is related to composite articles that comprise one or more powder coated layers. In certain configurations, composite articles that include a porous thermoplastic core layer comprising at least one powder coated layer thereon. In some instances, the powder coated layer does not penetrate into the core layer to any substantial degree prior to coupling a surface layer to the core layer.

BACKGROUND

Articles for automotive and building materials applications typically are designed to meet a number of competing and stringent performance specifications. In many instances, it may be desirable for the article to provide both structural and aesthetic performance.

SUMMARY

Certain configurations of the prepregs, cores and composite articles described herein provide desirable attributes including, but not limited to, reduced cost, lighter weight, enhanced adhesion and the ability to control the thickness of an adhesive layer with higher precision. These and other attributes are discussed in more detail below.

In a first aspect, a thermoplastic composite article comprises a porous core layer and a powder coated layer. For example, the porous core layer comprises a web of reinforcing fibers held together by a thermoplastic material, e.g., the porous core layer may be a non-extruded porous core layer. The powder coated layer comprises a polymeric powder disposed on the porous core layer, in which an average particle size of the powder is selected to provide an interface between the powder coated layer and the porous core layer and where substantially all of the disposed powder of the powder coated layer is present above the interface.

In certain examples, the porosity of the core layer is greater than 10 by volume of the core layer. In some examples, the powder coated layer comprises a thermoplastic material, in which the thermoplastic material of the porous core layer is the same or different than the thermoplastic material of the powder coated layer. In other examples, the thermoplastic material of the porous core layer is a polyolefin and the thermoplastic material of the powder coated layer is a non-polyolefin or a polyolefin. In some examples, the thermoplastic material of the porous core layer is selected from the group consisting of a polyethylene, a polypropylene, a polystyrene, a polyimide, a polyetherimide, a polyamide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In certain configurations, the thermoplastic material of the powder coated layer comprises a polyurethane or a polyamide or a co-polyamide or a polypropylene. In other instances, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In some examples, the porous core layer further comprises a lofting agent. In some embodiments, no barrier, e.g., no film or barrier material, is present between the porous core layer and the powder coated layer such that the powder coated layer is disposed directly on the porous core layer.

In some examples, the article comprises a skin layer disposed on the powder coated layer. For example, the skin layer may be selected from the group consisting of a film, a frim, a scrim, a foil, a paper, a woven fabric, a non-woven fabric, a foam, an inorganic coating, an organic coating, a thermoplastic coating and a thermosetting material coating. In some examples, the composite article comprises a decorative layer disposed on the skin layer. In other examples, the porous core layer comprises a porosity of at least 10% by volume of the porous core layer, the porous core layer further comprising a thermoplastic material different from a thermoplastic material in the powder coated layer. In some instances, the porous core layer comprises a porosity of at least 10% by volume of the porous core layer, the porous core layer further comprising a thermoplastic material the same as a thermoplastic material in the powder coated layer. In certain embodiments, the porous core layer comprises a basis weight of about 300 gsm to about 3000 gsm and the powder coated layer comprises a basis weight of about 20 gsm to about 200 gsm. In other embodiments, the powder coated layer is effective to provide an average peel strength for the skin layer of at least 125 N/m in the machine direction and at least 125 N/m in the cross direction as tested by ASTM D903 Peel 180° dated 2010. In some examples, the powder coated layer is effective to provide an average peel strength for the skin layer of at least 390 N/m in the machine direction and at least 390 N/m in the cross direction as tested by ASTM D903 Peel 180° dated 2010. In other examples, the powder coated layer is effective to provide an average peel strength for the skin layer of at least 250 N/m in the machine direction and at least 250 N/m in the cross direction as tested by ASTM D903 Peel 180° dated 2010. In some instances, a basis weight of the powder coated layer on the porous core layer is selected to provide a peel strength, as tested by ASTM D903 Peel 180° dated 2010, which is the same as or greater than a reference peel strength, as tested by ASTM D903 Peel 180° dated 2010, provided by a thermoplastic film disposed on the porous core layer. In other examples, the reference peel strength is determined using a thermoplastic film comprising a basis weight of about 50 gsm to about 100 gsm.

In another aspect, a thermoplastic composite article comprises a porous core layer comprising a web of reinforcing fibers held together by a thermoplastic material, e.g., the porous core layer may be a non-extruded porous core layer, and a powder coated layer comprising a non-polyolefin powder disposed on the porous core layer. For example, a particle size of non-polyolefin powder is selected to provide an interface between the powder coated layer and the porous core layer where substantially all of the disposed non-polyolefin powder of the powder coated layer is present above the interface.

In some examples, the porosity of the core layer is greater than 10% by volume of the core layer. In other examples, the powder coated layer further comprises a polyolefin thermoplastic material, in which the thermoplastic material of the porous core layer is the same or different than the polyolefin thermoplastic material of the powder coated layer. In further examples, the thermoplastic material of the porous core layer is a polyolefin and the non-polyolefin material of the powder coated layer is a thermoplastic non-polyolefin powder. In some examples, the thermoplastic material of the porous core layer is selected from the group consisting of a polyethylene, a polypropylene, a polystyrene, a polyimide, a polyetherimide, a polyamide an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In other instances, the non-polyolefin material of the powder coated layer is a polyurethane or a polyamide or a co-polyamide or a polypropylene. In some embodiments, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In other embodiments, the porous core layer further comprises a lofting agent. In some examples, no barrier, e.g., no film or barrier material, is present between the porous core layer and the powder coated layer such that the powder coated layer is disposed directly on the porous core layer.

In some instances, the article comprises a skin layer disposed on the powder coated layer. For example, the skin layer can be selected from the group consisting of a film, a frim, a scrim, a foil, a paper, a woven fabric, a non-woven fabric, a foam, an inorganic coating, an organic coating, a thermoplastic coating and a thermosetting material coating. In some examples, a decorative layer is disposed on the skin layer. In other examples, the porous core layer comprises a porosity of at least 10% by volume of the porous core layer, the porous core layer further comprising a thermoplastic material different from a non-polyolefin thermoplastic material in the powder coated layer. In some embodiments, the porous core layer comprises a porosity of at least 10% by volume of the porous core layer, the porous core layer further comprising a thermoplastic material the same as a thermoplastic material in the powder coated layer. In some instances, the porous core layer comprises a basis weight of about 300 gsm to about 3000 gsm and the powder coated layer comprises a basis weight of about 20 gsm to about 200 gsm. In other examples, the powder coated layer is effective to provide an average peel strength for the skin layer of at least 125 N/m in the machine direction and at least 125 N/m in the cross direction as tested by ASTM D903 Peel 180° dated 2010. In some examples, the powder coated layer is effective to provide an average peel strength for the skin layer of at least 390 N/m in the machine direction and at least 390 N/m in the cross direction as tested by ASTM D903 Peel 180° dated 2010. In certain examples, the powder coated layer is effective to provide an average peel strength for the skin layer of at least 250 N/m in the machine direction and at least 250 N/m in the cross direction as tested by ASTM D903 Peel 180° dated 2010. In some instances, a basis weight of the powder coated layer on the porous core layer is selected to provide a peel strength, as tested by ASTM D903 Peel 180° dated 2010, which is the same as or greater than a reference peel strength, as tested by ASTM D903 Peel 180° dated 2010, provided by a thermoplastic film disposed on the porous core layer. For example, the reference peel strength is determined using a thermoplastic film comprising a basis weight of about 50 gsm to about 100 gsm.

In an additional aspect, a thermoplastic composite article comprises a porous core layer comprising a web of reinforcing fibers held together by a thermoplastic material, e.g., the porous core layer may be a non-extruded porous core layer, a powder coated layer comprising a powder disposed on the porous core layer, and a skin layer disposed on the powder coated layer, in which a basis weight of the powder coated layer is selected to provide a machine direction peel strength for the skin of at least 125 N/m and a cross direction peel strength of at least 125 N/m as tested by ASTM D903 Peel 180° dated 2010.

In some examples, an average particle size of the powder in the powder coated layer is selected to provide an interface between the powder coated layer and the porous core layer where at least 50% by weight of the disposed powder of the powder coated layer is present above the interface. In other examples, the thermoplastic material of the porous core layer is selected from the group consisting of a polyethylene, a polypropylene, a polystyrene, a polyimide, a polyetherimide, a polyamide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In certain instances, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In some examples, the porous core layer comprises a basis weight of about 300 gsm to about 3000 gsm and the powder coated layer comprises a basis weight of about 20 gsm to about 200 gsm. In certain embodiments, the powder coated layer is effective to provide an average peel strength for the skin layer of at least 125 N/m in the machine direction and at least 125 N/m in the cross direction as tested by ASTM D903 Peel 180° dated 2010. In other embodiments, the powder coated layer is effective to provide an average peel strength for the skin layer of at least 390 N/m in the machine direction and at least 390 N/m in the cross direction as tested by ASTM D903 Peel 180° dated 2010. In some examples, the powder coated layer is effective to provide an average peel strength for the skin layer of at least 250 N/m in the machine direction and at least 250 N/m in the cross direction as tested by ASTM D903 Peel 180° dated 2010. In certain examples, a basis weight of the powder coated layer on the porous core layer is selected to provide a peel strength, as tested by ASTM D903 Peel 180° dated 2010, which is the same as or greater than a reference peel strength, as tested by ASTM D903 Peel 180° dated 2010, provided by a thermoplastic film disposed on the porous core layer. In other examples, the reference peel strength is determined using a thermoplastic film comprising a basis weight of about 50 gsm to about 100 gsm.

In another aspect, a thermoplastic composite article comprises a porous core layer comprising a web of reinforcing fibers held together by a thermoplastic material, e.g., the porous core layer may be a non-extruded porous core layer, and a powder coated layer comprising a powder disposed directly on the porous core layer without any intervening layers, in which the disposed powder comprises an average particle size selected to prevent penetration of the powder into voids of the porous core layer.

In certain examples, an average particle size of the powder in the powder coated layer is selected to provide an interface between the powder coated layer and the porous core layer where all of the disposed powder of the powder coated layer is present above the interface. In other examples, the thermoplastic material of the porous core layer is selected from the group consisting of a polyethylene, a polypropylene, a polystyrene, a polyimide, a polyetherimide, a polyamide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In some embodiments, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In other embodiments, the porous core layer comprises a basis weight of about 300 gsm to about 3000 gsm and the powder coated layer comprises a basis weight of about 20 gsm to about 200 gsm. In some instances, the powder coated layer is effective to provide an average peel strength for the skin layer of at least 125 N/m in the machine direction and at least 125 N/m in the cross direction as tested by ASTM D903 Peel 180° dated 2010. In other instances, the powder coated layer is effective to provide an average peel strength for the skin layer of at least 390 N/m in the machine direction and at least 390 N/m in the cross direction as tested by ASTM D903 Peel 180° dated 2010. In certain examples, the powder coated layer is effective to provide an average peel strength for the skin layer of at least 250 N/m in the machine direction and at least 250 N/m in the cross direction as tested by ASTM D903 Peel 180° dated 2010. In other examples, a basis weight of the powder coated layer on the porous core layer is selected to provide a peel strength, as tested by ASTM D903 Peel 180° dated 2010, which is the same as or greater than a reference peel strength, as tested by ASTM D903 Peel 180° dated 2010, provided by a thermoplastic film disposed on the porous core layer. In some examples, the reference peel strength is determined using a thermoplastic film comprising a basis weight of about 50 gsm to about 100 gsm.

In an additional aspect, a thermoplastic composite article comprises a porous core layer comprising a web of reinforcing fibers held together by a thermoplastic material, e.g., the porous core layer may be a non-extruded porous core layer, a film disposed on the porous core layer, a powder coated layer comprising a powder disposed on the film, and a skin disposed on the powder coated layer, in which a basis weight of the powder coated layer is selected to provide a machine direction peel strength for the skin of at least 125 N/m and a cross direction peel strength of at least 125 N/m as tested by ASTM D903 Peel 180° dated 2010. In some examples, the film may comprise a thickness of 500 mils or less.

In certain examples, an average particle size of the powder in the powder coated layer is selected to provide an interface between the powder coated layer and the porous core layer wherein at least 50% by weight of the disposed powder of the powder coated layer is present above the interface. In other examples, the thermoplastic material of the porous core layer is selected from the group consisting of a polyethylene, a polypropylene, a polystyrene, a polyimide, a polyetherimide, a polyamide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In some embodiments, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In other examples, the porous core layer comprises a basis weight of about 300 gsm to about 3000 gsm and the powder coated layer comprises a basis weight of about 20 gsm to about 200 gsm. In certain examples, the powder of the powder coated layer comprises a non-polyolefin thermoplastic material and the core comprises a polyolefin thermoplastic material. In some examples, the porous core layer comprises a porosity of at least 10% by volume of the core layer. In certain configurations, the powder comprises a polyurethane powder or a co-polyamide powder or a polypropylene powder. In some examples, a decorative layer is disposed on the skin. In other examples, the composite article comprises a foam disposed between the skin and the decorative layer.

In another aspect, a vehicle headliner article comprises a porous core layer comprising a web of reinforcing fibers held together by a polymeric material, e.g., the porous core layer may be a non-extruded porous core layer, a powder coated layer comprising a polymeric powder disposed on the porous core layer, in which an average particle size of the powder is selected to provide an interface between the powder coated layer and the porous core layer, and a decorative layer coupled to the powder coated layer, in which the headliner article is constructed and arranged to couple to an underside of a roof of a vehicle and span from a front windshield of the vehicle to a back windshield of the vehicle and to span from a left side of the vehicle to a right side of the vehicle.

In some examples, at least 50% by weight of the disposed powder of the powder coated layer is present above the interface. In other examples, the porosity of the core layer is greater than 10 by volume of the core layer. In some configurations, each of the powder coated layer and the porous core layer comprises a thermoplastic material, in which the thermoplastic material of the porous core layer is the same or different than the thermoplastic material of the powder coated layer. In other configurations, the thermoplastic material of the porous core layer is selected from the group consisting of a polyethylene, a polypropylene, a polystyrene, a polyimide, a polyetherimide, a polyamide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In some examples, the thermoplastic material of the powder coated layer comprises a polyurethane or a polyamide or a co-polyamide or a polypropylene. In some examples, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In other examples, the polymeric material of the core layer comprises a thermoplastic material or a thermosetting material or both. In certain examples, no barrier, e.g., no film or barrier material, is present between the porous core layer and the powder coated layer such that the powder coated layer is disposed directly on the porous core layer. In other examples, the vehicle headliner article comprises a skin layer disposed on the powder coated layer and positioned between the powder coated layer and the decorative layer.

In another aspect, an underbody shield comprises a porous core layer comprising a web of reinforcing fibers held together by a polymeric material, e.g., the porous core layer may be a non-extruded porous core layer, a powder coated layer comprising a polymeric powder disposed on the porous core layer, in which an average particle size of the powder is selected to provide an interface between the powder coated layer and the porous core layer, and a skin layer coupled to the powder coated layer, in which the underbody shield is constructed and arranged to couple to an underbody of a vehicle.

In some examples, at least 50% by weight of the disposed powder of the powder coated layer is present above the interface. In other examples, the porosity of the core layer is greater than 10 by volume of the core layer. In some embodiments, each of the porous core layer and the powder coated layer comprises a thermoplastic material, in which the thermoplastic material of the porous core layer is the same or different than the thermoplastic material of the powder coated layer. In other embodiments, the thermoplastic material of the porous core layer is selected from the group consisting of a polyethylene, a polypropylene, a polystyrene, a polyimide, a polyetherimide, a polyamide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In some configurations, the thermoplastic material of the powder coated layer comprises a polyurethane or a polyamide or a co-polyamide or a polypropylene. In other examples, the reinforcing fibers are selected from the group consisting of glass fibers, aramid fibers, graphite fibers, carbon fibers, inorganic mineral fibers, metal fibers, metalized synthetic fibers, and metallized inorganic fibers and combinations thereof. In some instances, the polymeric material of the porous core layer comprises a thermoplastic material or a thermosetting material or both. In other examples, no barrier, e.g., no film or barrier material, is present between the porous core layer and the powder coated layer such that the powder coated layer is disposed directly on the porous core layer. In certain instances, the underbody shield comprises a skin layer disposed on the powder coated layer and positioned between the powder coated layer and the decorative layer.

In another aspect, a method of producing a thermoplastic composite article comprises disposing a skin on a porous core layer, the method comprising disposing a skin on a powder coated layer disposed on the porous core layer, the powder coated layer providing an interface between the porous core layer and effective to adhere the skin to the porous core layer to provide a peel strength for the skin of at least 125 N/m in the machine direction and a peel strength of at least 125 N/m in the cross direction as tested by ASTM D903 Peel 180° dated 2010. If desired, the powder coated layer may be directly disposed on the porous core layer without any intervening materials.

In some examples, the method comprises selecting a thermoplastic material of the powder coated layer to be the same or different than a thermoplastic material of the porous core layer. In other examples, the method comprises selecting the thermoplastic material of the porous core layer to comprise a polyolefin and selecting the thermoplastic material of the powder coated layer to comprise a non-polyolefin or a polyolefin. In further examples, the method comprises selecting a thermoplastic material of the powder coated layer and the thermoplastic material of the porous core layer to be a same material, and selecting an average particle size of the thermoplastic material of the powder coated layer to be larger than an average particle size of the thermoplastic material of the porous core layer. In some instances, the method comprises compressing the porous core layer prior to disposing the powder coated layer on the porous core layer. In other examples, the method comprises compressing the thermoplastic composite article after disposing the skin on the powder coated layer. In some examples, the method comprises molding the thermoplastic composite article after disposing the skin on the powder coated layer. In some configurations, the method comprises disposing an additional skin on an opposite surface of porous core layer that comprises the powder coated layer and the skin. In other configurations, the method comprises disposing a decorative layer on the skin. In some examples, the method comprises forming the porous core layer by: combining a thermoplastic material and reinforcing fibers to form an agitated aqueous foam, disposing the agitated aqueous foam onto a wire support, evacuating the water to form a web, heating the web to a first temperature at or above the melting temperature of the thermoplastic material, and compressing the web to a first thickness.

In an additional aspect, a method of producing a thermoplastic composite article comprises disposing a powder coated layer onto a porous core layer in an effective amount to provide a peel strength for a skin disposed on the powder coated layer of at least 125 N/m in the machine direction and a peel strength of at least 125 N/m in the cross direction as tested by ASTM D903 Peel 180° dated 2010, and disposing the skin on the disposed powder coated layer.

In certain examples, the method comprises selecting a thermoplastic material of the powder coated layer to be the same or different than a thermoplastic material of the porous core layer. In some examples, the method comprises selecting the thermoplastic material of the porous core layer to comprise a polyolefin and selecting the thermoplastic material of the powder coated layer to comprise a non-polyolefin or a polyolefin. In other examples, the method comprises selecting a thermoplastic material of the powder coated layer and the thermoplastic material of the porous core layer to be a same material, and selecting an average particle size of the thermoplastic material of the powder coated layer to be larger than an average particle size of the thermoplastic material of the porous core layer. In some examples, the method comprises compressing the porous core layer prior to disposing the powder coated layer on the porous core layer. In some instances, the method comprises compressing the thermoplastic composite article after disposing the skin on the powder coated layer. In other examples, the method comprises molding the thermoplastic composite article after disposing the skin on the powder coated layer. In some embodiments, the method comprises disposing an additional skin on an opposite surface of porous core layer that comprises the powder coated layer and the skin. In other examples, the method comprises disposing a decorative layer on the skin. In some examples, the method comprises forming the porous core layer by: combining a thermoplastic material and reinforcing fibers to form an agitated aqueous foam, disposing the agitated aqueous foam onto a wire support, evacuating the water to form a web, heating the web to a first temperature at or above the melting temperature of the thermoplastic material, and compressing the web to a first thickness.

In another aspect, a method of producing a thermoplastic composite article comprises combining a thermoplastic material and reinforcing fibers to form an agitated aqueous foam, disposing the agitated aqueous foam onto a wire support, evacuating the water to form a web, heating the web to a first temperature at or above the melting temperature of the thermoplastic material, compressing the web to a first thickness to provide a porous core layer, powder coating a powder material onto the porous core layer to provide a powder coated layer, and disposing a skin on the powder coated layer to provide the thermoplastic composite article.

In certain examples, the method comprises heating the porous core layer prior to disposing the powder material. In other examples, the method comprises disposing the skin on the heated porous core layer comprising the powder coated layer. In some instances, the method comprises molding the thermoplastic composite article. In some examples, the method comprises lofting the thermoplastic article. In other embodiments, the method comprises configuring the agitated aqueous foam to comprise a lofting agent. In certain instances, the method comprises configuring the powder material to comprise a thermoplastic material. In some examples, the thermoplastic material of the powder material comprises a non-polyolefin powder material and the thermoplastic material of the foam comprises a polyolefin. For example, the non-polyolefin powder material may comprise a polyurethane powder or other non-polyolefin powder materials. In some examples, the method comprises configuring the thermoplastic material of the foam to comprise polypropylene and configuring the reinforcing fibers to comprise glass fibers.

If desired, one or more additional powder coated layers can be present on the articles described herein.

Additional features, aspect, examples, configurations and embodiments are described in more detail below.

BRIEF DESCRIPTION OF THE FIGURES

Certain embodiments are described with reference to the accompanying figures in which.

Figure 1:
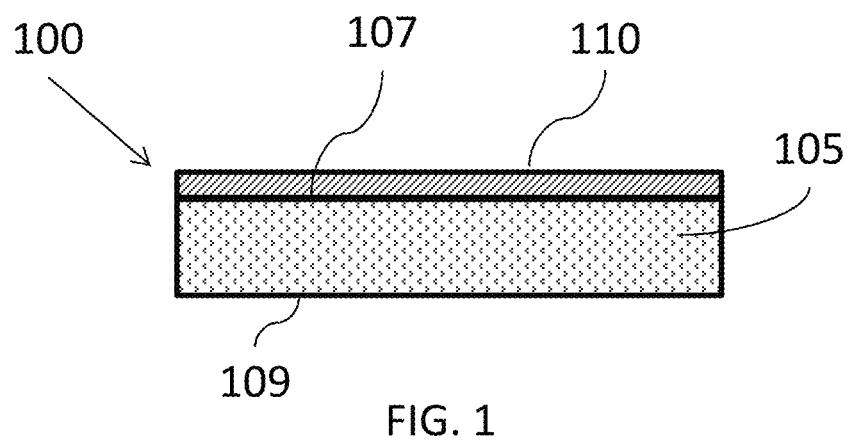
FIG. 1 is an illustration of a prepreg comprising a powder coated layer, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes or thickness of different layers in the figure components are not intended to limit the sizes of any of the components or layers in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar materials, if desired. In some instances, the various layers are shown as including stubble, dots, slashes, etc. for illustration purposes. The arrangement of the stubbles, dots, slashes, etc. is not intended to imply any particular material or distribution unless otherwise specified in the context of describing that particular figure.

DETAILED DESCRIPTION

Certain embodiments are described below with reference to singular and plural terms in order to provide a more user friendly description of the technology disclosed herein. These terms are used for convenience purposes only and are not intended to limit the prepregs, cores, articles, composites and other subject matter as including or excluding certain features unless otherwise noted as being present in, or excluded from, a particular embodiment described herein. As noted in more detail herein, the prepregs or core layers may take the form of non-extruded core layers or non-extruded prepreg layers to provide for a desired amount of porosity in the prepreg or core layers.

In certain instances, thermoplastic composite articles are often molded or processed into various shapes to provide a final formed part or article. The exact final article formed may depend on the particular use application. For example, in some instances, the prepregs and cores described herein may be provided in sheet form which can then be molded, trimmed or shaped to a desired geometry or structure. In certain instances, the sheets may be processed to provide a vehicular headliner, a vehicle underbody shield, a vehicle cargo tray or storage compartment, etc. In other instances, the composite articles can be molded or processed to provide office furniture or indoor building products including, but not limited to, cubicles, wall coverings, e.g., wall covering which can attached to wall studs or cover existing drywall or other materials attached to wall studs, seatbacks, seat frames, roofing panels, ceiling panels, flooring or other articles which may be used in office or building applications.

In certain configurations, the articles described herein may comprise a prepreg layer or a core layer. While not wishing to be bound by any particular theory, a prepreg layer is generally not a fully formed or processed version of a core layer. For example, a partially formed layer comprising a thermoplastic material (or other polymeric material) and a plurality of fibers is generally referred to as a prepreg layer, whereas a fully formed layer comprising a thermoplastic material (or other polymeric material) and a plurality of fibers is generally referred to as a core layer. As noted herein, even though the core layer may be considered formed or cured, the core layer can still be coupled to one or more skin layers, power coated layers, etc. to alter the overall properties of a composite article comprising the core layer. The description below makes reference to both a prepreg and a core layers and the materials (and their amounts and properties) used in connection with a prepreg layer can also be used in a core layer if desired.

In certain examples and referring to FIG. 1, a simplified illustration of a prepreg 100 is shown. The prepreg 100 comprises a core layer 105 coupled to a powder coated layer 110 disposed on a first surface 107 of the core layer 105. Where the core layer 105 takes three-dimensional forms, the powder coated layer 110 (or other layers) may also be present on one or more side surfaces of the core layer 110. In other configurations, the powder coated layer may be disposed such that it is present only on a planar surface (or some portion thereof) of the core layer 105. As discussed in more detail below, the core layer 105 is typically a porous structure which may comprise a web comprising a plurality of reinforcing fibers held together by a thermoplastic material. The porosity of the web can be particularly high, e.g., greater than 20%, 30%, 40% or even greater than 50% by volume, if desired. The powder coating material and conditions can be selected such that no powder coated material penetrates into the web, e.g., a defined interface between the powder coated layer 110 and the core layer 105 exists, or can be selected such that some amount of the powder coated material may penetrate or occupy void space of the core layer 105. For example, the particle size and powder coating conditions can be selected such that all of the powder coated material (or substantially all of the powder coated material) remains on the surface 107 of the core layer 105. Where the powder coated layer 110 is effective to function as an adhesive, this resulting layering can provide for enhanced amounts of material, e.g., powder coating material, to be present on the surface 107 to bond with another layer to be coupled to the prepreg 100 through the powder coated layer 110. While the exact average particle size of the powder material used in the powder coated layer 110 can vary, in some instances the average particle diameter of the particles used in the powder coated layer 110 can be greater than the average pore size to enhance retention of the powder material on top of the prepreg 100.

In certain instances, at least one material of the powder coated layer 110 may be the same as one material present in the core layer 105, e.g., each of the core layer and powder coated layer may comprise a thermoplastic, thermosetting material or other material. In some instances, the layers 105, 110 may share one or more common materials but the exact form or size of the common material may be different in the different layers 105, 110. For example, the core layer 105 and the powder coated layer 110 may each comprise the same polyolefin type, e.g., polyethylene, polypropylene, etc., but the form or size of the materials may be different in the different layers. In some instances where a common material is present in the layers 105, 110, the average particle size of the common material in the core layer 105 may be greater than the average particle size of the material in the layer 110. It may be desirable, however, to configure the layer 110 with an average particle size larger than the average particle size of the common material in the core layer 105 to enhance surface retention of the powder coated material on the core layer 105. In some instances, the common material may be present in a different form in the core layer 105 than in the powder coated layer 110. For example, each of the core layer 105 and the powder coated layer 110 may comprise a thermoplastic material (which may be the same or different), but the thermoplastic material in the core layer 105 may be present in a first form, e.g., fiber form, and the thermoplastic material in the layer 110 may be present in a second form different than the first form, e.g., as particles. In other instances, the core layer 105 may comprise a mixture of types of materials, e.g., fibers and particles, and the layer 110 may comprise, for example, only fibers or only particles. If desired, the layer 110 could instead comprise a mixture of types of materials, e.g., fibers and particles, and the core layer 105 may comprise only fibers or only particles, for example. In other configurations, there are no common materials present in the core layer 105 and the powder coated layer 110. Where the core layer 105 and the layer 110 each comprise a thermoplastic material (or thermosetting material or other material), the thermoplastic material (or thermosetting material or other material) may be the same or may be different. In certain configurations, the core layer 105 may comprise a thermoplastic material in combination with reinforcing fibers, and the layer 110 may comprise a thermoplastic material, e.g., polyolefin, thermoplastic polyurethane, etc. or other materials such as thermosetting materials, e.g., thermosetting polyurethanes, etc. without any fibers present in the layer 110.

Figure 2:
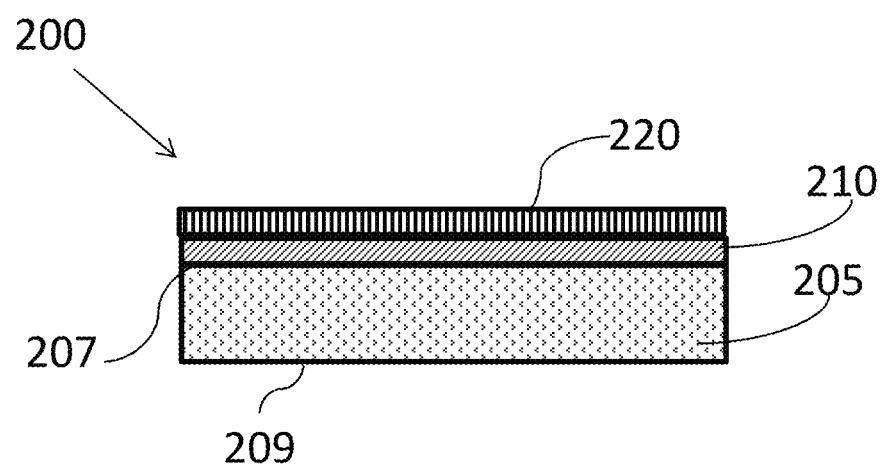
FIG. 2 is an illustration of a prepreg comprising a powder coated layer and a skin, in accordance with certain embodiments.

In certain examples, the powder coated layers described herein can be used to couple an additional layer to the core layer. Referring to FIG. 2, a prepreg 200 is shown that comprises a core layer 205 comprising a first surface 207 and a second surface 209. A powder coated layer 210 is present on the first surface 207. A skin 220 is disposed on the powder coated layer 210 to provide the prepreg 200. While various methods to produce the prepreg 200 are described in more detail below, the powder coated layer 210 can be disposed on the core layer 205 prior to disposing the skin 220 on the powder coated layer 210, or the powder coated layer can be disposed on the additional layer 220 prior to coupling the additional layer 220 to the core layer 205 through the powder coated layer 210. The layer 220 may take various forms including, but not limited to, a film (e.g., thermoplastic film or elastomeric film), a frim (e.g., a combination of a film and a scrim), a scrim (e.g., fiber based scrim), a foil, a paper, a woven fabric, a non-woven fabric, a foam, or be present as an inorganic coating, an organic coating, thermoplastic coating or a thermosetting material coating. In other instances, the layer 220 may comprise a limiting oxygen index greater than about 22, as measured per ISO 4589 dated 1996. Where a thermoplastic film is present as (or as part of) the layer 220, the thermoplastic film may comprise at least one of polyolefin, poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the layer 220, the fiber based scrim may comprise at least one of glass fibers, aramid fibers, graphite fibers, carbon fibers, inorganic mineral fibers, metal fibers, metalized synthetic fibers, polymer fiber and metalized inorganic fibers. Where a thermosetting material coating is present as (or as part of) the layer 220, the coating may comprise at least one of unsaturated polyurethanes, vinyl esters, phenolics and epoxies. Where an inorganic coating is present as (or as part of) the layer 220, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 220, the non-woven fabric may comprise a thermoplastic material, a thermal setting binder, inorganic fibers, polymer fiber, metal fibers, metallized inorganic fibers and metallized synthetic fibers.

Figure 3:
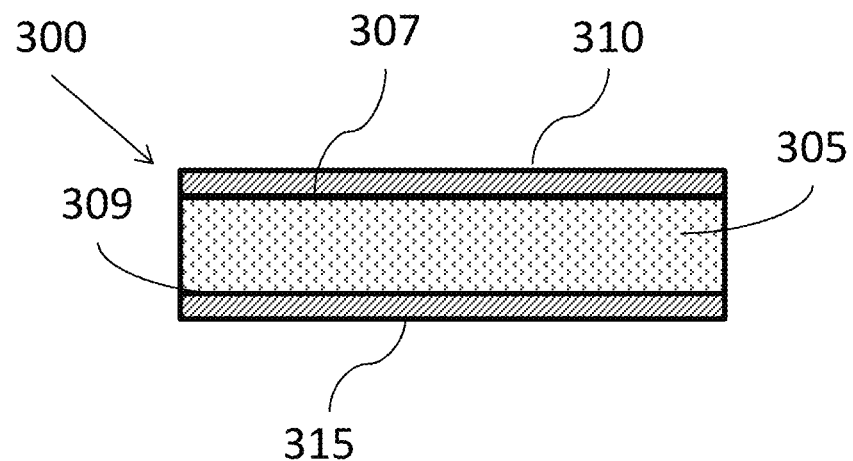
FIG. 3 is an illustration of a prepreg comprising a powder coated layer on each surface of a core layer, in accordance with certain examples.

In certain examples and referring to FIG. 3, an illustration of a prepreg 300 is shown. The prepreg 300 comprises a core layer 305 coupled to a first powder coated layer 310 disposed on a first surface 307 of the core layer 305. The prepreg 300 also comprises a second powder coated layer 315 disposed on a second surface 309 of the core layer 305. As noted in connection with FIG. 1, the powder coating material and conditions can be selected such that no powder coated material, or substantially no powder coated material, penetrates into a web of the core layer 305, e.g., a first interface between the powder coated layer 310 and the core layer 305 and a second interface between the powder coated layer 315 and the core layer 305 can exist. For example, the particle size and powder coating conditions can be selected such that all of the powder coated material (or substantially all of the powder coated material) remains on the surface 307, 309 of the core layer 305. If desired, however, certain amounts of the powder coated material may penetrate into the core. The particular particle size used, e.g., the average particle diameter of the powder coated layer, may vary depending on the particular material selected for use as a powder and the overall size of the pores in the underlying core layer 305. In some instances, the powder is a non-polyolefin powder including, but not limited to, a polyamide, a thermoplastic polyurethane, a co-polyamide or other suitable materials. In some instances, the powder is a polyolefin powder including, but not limited to, a polypropylene, a polyethylene and other suitable materials and combinations thereof. Where each of the powder coated layers 310, 315 is effective to function as an adhesive, this resulting layering can provide for enhanced amounts of material to be present on the surfaces 307, 309 to bond with another layer to be coupled to the prepreg 300 through the powder coated layers 310, 315.

In certain instances, at least one material in one or both of the powder coated layers 310, 315 may be the same as one material present in the core layer 305, e.g., each of the core layer and powder coated layer may comprise a thermoplastic, thermoset or other material. In some instances, the layers 305, 310, 315 may all share one or more common materials but the exact form or size of the common material may be different in the different layers 305, 310, 315. For example, the core layer 305 and the powder coated layers 310, 315 may each comprise the same polyolefin type, e.g., polyethylene, polypropylene, etc., but the form or size of the materials may be different in the different layers. In some instances where a common material is present in the layers 305, 310, 315 the average particle size of the common material in the core layer 305 may be greater than the average particle size of the material in the layer 310 or the layer 315. It may be desirable, however, to configure the layers 310, 315 with an average particle size larger than the average particle size of the common material in the core layer 305 to enhance surface retention of the powder coated material on the core layer 305. In some instances, the common material may be present in a different form in the core layer 305 than in the powder coated layers 310, 315. For example, each of the core layer 305 and the powder coated layers 310, 315 may comprise a thermoplastic material (which may be the same or different), but the thermoplastic material in the core layer 305 may be present in a first form, e.g., fiber form, and the thermoplastic material in the layers 310, 315 may be present in a form different than the first form, e.g., as particles. In other instances, the core layer 305 may comprise a mixture of types of materials, e.g., fibers and particles, and the layers 310, 315 may comprise, for example, only fibers or only particles. If desired, the layers 310, 315 could instead comprise a mixture of types of materials, e.g., fibers and particles, and the core layer 305 may comprise only fibers or only particles, for example. In other configurations, there are no common materials present in the core layer 305 and the powder coated layers 310, 315. Where the core layer 305 and the layers 310, 315 each comprise a thermoplastic material, the thermoplastic material may be the same or may be different. In certain configurations, the core layer 305 may comprise a thermoplastic material in combination with reinforcing fibers, and the layers 310, 315 may comprise a thermoplastic material, e.g., polyolefin, thermoplastic polyurethane, etc. or other materials such as thermosetting materials, e.g., thermosetting polyurethanes, etc. without any fibers present in the layers 310, 315.

In certain configurations, the materials present in the layers 310, 315 may be the same or may be different. For example, the materials in the layer 310, 315 may be the same and may comprise substantially the same size and/or form. In other instances, the layers 310, 315 may comprise the same materials but may be present at a different thickness. In additional configurations, the materials in the layers 310, 315 may be different. In other instances, the particular pattern provided by disposing the powder coated layer on a core layer may be different in the layers 310, 315. For example, the layer 310 may be disposed as a generally planar layer across the entire surface 307, whereas the layer 315 can be disposed as strips or areas of material on the surface 309 rather than a continuous layer to permit exposure of the core layer 305 in certain areas. While the various powder coated layers are shown in FIGS. 1-3 (and other figures herein) as a single layer, the powder coated layers may be produced by successive deposition of a plurality of individual layers to build up the overall layer to a desired thickness or shape. Successive layers may be the same powder coated material or may comprise different powder coated materials.

Figure 4:
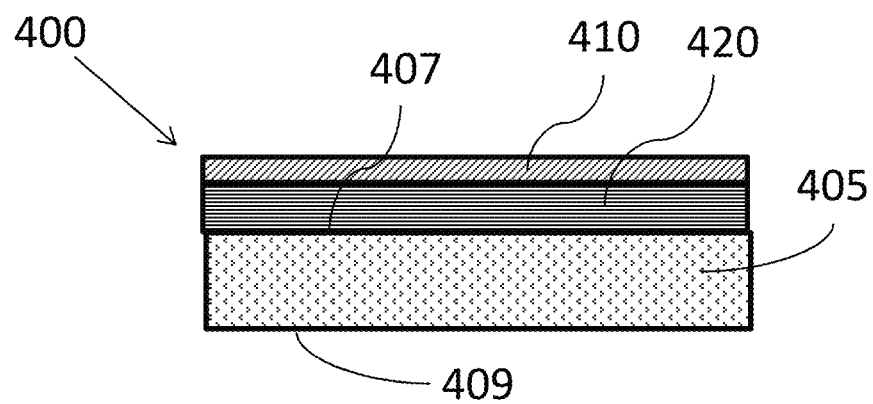
FIG. 4 is an illustration of a prepreg comprising a skin and a powder coated layer on the skin, in accordance with certain configurations.

In certain embodiments, it may be desirable to first couple a skin or other material to the core layer prior to disposing the powder coated material onto the prepreg surface. Referring to FIG. 4, a prepreg 400 is shown comprising a core layer 405 with a first surface 407 and a second surface 409. A skin 420 has been disposed on the first surface 407. While not shown, either a skin or a powder coated layer may be disposed on the second surface 409. A powder coated layer 410 is disposed on the skin 420. The powder coated layer 410 may comprise one or more of the same materials as is present in the skin 420 and the core layer 405. In some instances, the materials in the powder coated layer 410 are different than the materials of the skin 420 and/or the core layer 405. While various methods to produce the prepreg 400 are described in more detail below, the powder coated layer 410 can be disposed on the skin 420 prior to disposing the skin 420 on the core layer 405, or the powder coated layer can be disposed on the skin 420 after the skin has been disposed on the core layer 405. The skin 420 may take various forms including, but not limited to, a film (e.g., thermoplastic film or elastomeric film), a frim (e.g., a combination of a film and a scrim), a scrim (e.g., fiber based scrim), a foil, a paper, a woven fabric, a non-woven fabric, a foam, or be present as an inorganic coating, an organic coating, a thermoplastic coating or a thermosetting material coating. In other instances, the skin 420 may comprise a limiting oxygen index greater than about 22, as measured per ISO 4589 dated 1996. Where a thermoplastic film is present as (or as part of) the skin 420, the thermoplastic film may comprise at least one of polyolefin, poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 420, the fiber based scrim may comprise at least one of glass fibers, aramid fibers, graphite fibers, carbon fibers, inorganic mineral fibers, metal fibers, polymer fibers, metalized synthetic fibers, and metalized inorganic fibers. Where a thermosetting material coating is present as (or as part of) the skin 420, the coating may comprise at least one of unsaturated polyurethanes, vinyl esters, phenolics and epoxies. Where an inorganic coating is present as (or as part of) the skin 420, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 420, the non-woven fabric may comprise a thermoplastic material, a thermal setting binder, inorganic fibers, polymer fibers, metal fibers, metallized inorganic fibers and metallized synthetic fibers. In some instances, the skin 420 may comprise a generally non-porous material which permits formation of an interface between the skin 420 and the powder coated layer 410, whereas in other instances the skin 420 may be porous at least to some degree. For example, it may be desirable to configure the skin 420 as a very thin non-porous film, e.g., 1-5 mils thick, which can act as a barrier to deter the powder coated material in the layer 410 from entering into the core layer 405. In certain instances, the skin 420 may comprise a film comprising the same thermoplastic material as is present in the core layer 405, whereas in other examples the skin 420 may comprise materials that are different than the materials of the core layer 405. Heating of the prepreg 400 during molding or other processing steps can result in melting of the film of the skin 420 into the core layer 405.

Figure 5:
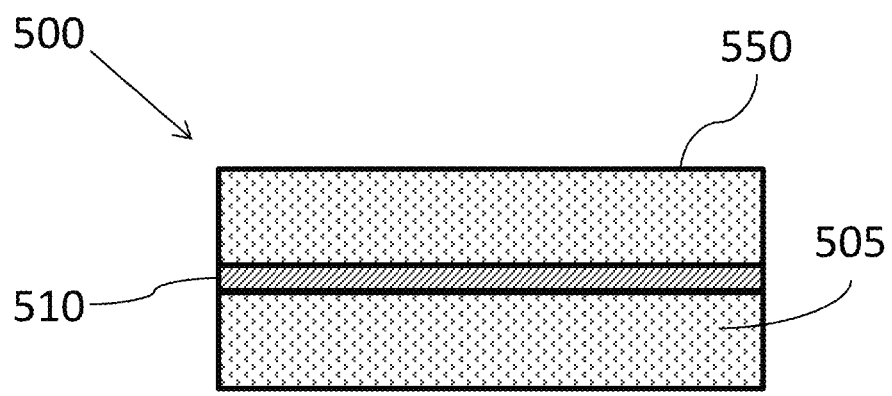
FIG. 5 is an illustration of two core layers coupled to each other through a powder coated layer, in accordance with certain instances.

In certain embodiments, the powder coated layers described herein can be used to couple two or more core layers to each other. Referring to FIG. 5, a first core layer 505 is coupled to a second core layer 550 through a powder coated layer 510. Each of the first and second core layers 505, 550 may be the same or may be different. In some instances, the core layers 505, 550 may comprise the same materials but may comprise a different porosity or basis weight or other different physical properties. In producing the prepreg of FIG. 5, the powder coated layer 510 may be disposed on one or both of the core layers 505, 550 prior to coupling them. In addition, a skin may be disposed on one or both of the core layers 505, 550 prior to coupling them. For example, a skin may be present on an outer surface of one or both of the core layers 505, 550 or may be present between the powder coated layer 510 and one of the core layers 505, 550. In some instances, one or both of the core layers 505, 550 may be compressed prior to coupling of the two core layers 505, 550. In other instances, one or both of the core layers 505, 550 may be lofted prior to coupling the two core layers 505, 550 to each other. If desired, one of the core layers 505, 550 can be molded to a desired shape and the other core layer may then be coupled to the molded core layer through the powder coated layer 510. In some instances, the entire prepreg 500 may be molded. In certain configurations, one or more skins may be added to the prepreg 500 prior to molding. In other instances, an additional powder coated layer may be present on an outer surface of the core layer 505 or the core layer 550 or both.

Figure 6:
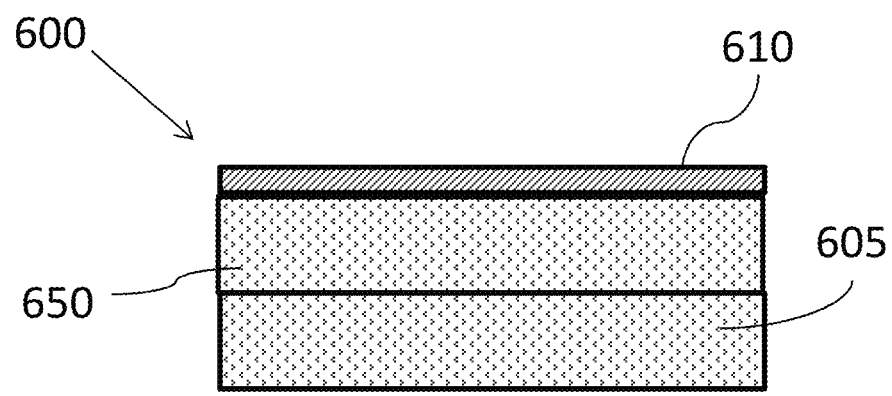
FIG. 6 is an illustration of two core layers coupled to each other with a powder coated layer disposed on one of the core layers, in accordance with certain instances.

In certain examples where multiple core layers are present, the core layers need not be coupled to each other through a powder coated layer. Referring to FIG. 6, a prepreg 600 is shown that comprises a first core layer 605 coupled to a second core layer 650 that comprises a powder coated layer 610 on a surface. Each of the first and second core layers 605, 650 may be the same or may be different. In some instances, the core layers 605, 650 may comprise the same materials but may comprise a different porosity or basis weight or other different physical properties. In producing the prepreg of FIG. 6, the powder coated layer 610 may be disposed on the core layer 650 prior to coupling the core layer 650 to the core layer 605 or may be disposed on the core layer 650 after the two core layers 605, 650 have been coupled to each other. While not shown, a skin may be disposed on one or both of the core layer 605 and the powder coated layer 610. For example, a skin may be present on an outer surface of the prepreg and couple to the core layer 650 through the powder coated layer 610. In some instances, one or both of the core layers 605, 650 may be compressed prior to coupling of the two core layers 605, 650. In other instances, one or both of the core layers 605, 650 may be lofted prior to coupling the two core layers 605, 650 to each other. If desired, one of the core layers 605, 650 can be molded to a desired shape and the other core layer may then be coupled to the molded core layer. In some instances, the entire prepreg 600 may be molded. In certain configurations, one or more skins may be added to the prepreg 600 prior to molding. In other instances, an additional powder coated layer may be present on an outer surface of the core layer 605 if desired.

In some instances, the prepregs, cores and articles described herein are porous or permeable materials that comprise open cell structures, e.g., voids. The presence of such open cell structures that are formed from thermoplastic material renders it more difficult for the prepregs, cores and articles to retain powder coated materials on their surface. By selecting the appropriate size and type of powder coated materials, the powder coated layer can be present with a defined interface, e.g., so that two distinct layers or structures can be ascertained, such that either a major amount, e.g., greater than 50% by weight of the powder coated material is retained above the defined interface. For example, at least 60%, 70%, 80% or more by weight of the powder coated material may be present above the interface. In other instances, the powder coated material is selected such that substantially all, e.g., greater than 90% by weight, of the powder coated material is present in a layer above the interface between the powder coated layer and the prepreg or core layer. In yet other configurations, essentially all of the powder coated material, e.g., 99% by weight or more, is present in the powder coated layer above the defined interface between the powder coated layer and the prepreg or core layer. As noted herein, the exact amount of material which penetrates into the porous core or prepreg later can be controlled or tuned by selecting the particle size of the powder coated material, the porosity of the prepreg or core layer and/or by including suitable barrier layers between the powder coated layer and the prepreg or core layer.

In certain configurations, a porous prepreg comprising one or more thermoplastic materials and a plurality of fibers that together provide an open cell structure, e.g., void space, can be produced. If desired, one or more flame retardants can be present in the void space and/or may also be present in any powder coated layer. For example, a flame retardant material can be loaded into the void space in a manner where the flame retardant material resides (at least in part) within the void space formed by crossing over of the fibers, which can be held in place by the thermoplastic material. In some instances, the thermoplastic materials and/or the fibers can be selected so that they are generally inert or non-reactive with the flame retardant material.

In certain configurations, the thermoplastic material of the prepreg or core layer may be present in fiber form, particle form, resin form or other suitable forms. In some instances, the thermoplastic material used in the prepreg can be present in particle form and have an average particle size that is substantially the same as the average particle size of the materials in the powder coated layer. In other configurations, the average particle size of the thermoplastic material in the prepreg or core layer may be less than that of the materials in the powder coated layer. In additional instances, the average particle size of the thermoplastic material in the prepreg or core layer may be greater than that of the materials in the powder coated layer. In some instances, the average particle size of the powder coated material and the average particle size of the thermoplastic material can vary by about 10% to about 15%. In certain configurations, the average particle size of each of the thermoplastic material and the powder coated material in the prepreg or core can differ by about 50 microns to about 1000 microns, more particularly about 50 microns to about 500 microns, e.g., about 50 microns to about 100 microns. In certain instances, the average particle size of the powder coated material may be in the range of about 50 microns to about 1000 microns, more particularly about 100 microns to about 500 microns, e.g., about 200 microns to about 300 microns. In some configurations, the average particle size of the powder coated material is at least 50% greater than the average particle size of the thermoplastic material particles to provide for enhanced processing. Even though the average particle size of the powder coated material may differ from the thermoplastic material, the chemical composition of the thermoplastic material and powder coated material can be the same or can be different. For example, two or more thermoplastic materials with different average particle sizes can be present in the core layer and the powder coated layer. Further, the powder coated layer itself may comprise two or more materials which may be the same, e.g., may be the same but have a different particle size, or may be different. If desired, the average particle size of at least one material in the prepreg or core may be about the same as an average particle size of the powder coated material. In some instances, an average particle size of each material in the prepreg or core may be about the same as an average particle size of the powder coated material.

In certain embodiments, the prepreg or core layers described herein generally comprise a substantial amount of open cell structure such that void space is present in the prepreg. For example, the prepreg may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. This void space may be created by formation of a web that comprises a plurality of reinforcing fibers held in place by the thermoplastic material. The porous web generally provides a porosity or void content of greater than 0%, e.g., is not fully consolidated, up to about 95%. Unless otherwise stated, the reference to the prepreg comprising a certain void content or porosity is based on the total volume of the prepreg and not necessarily the total volume of the prepreg plus any other materials or layers coupled to the prepreg.

In certain embodiments, the thermoplastic material of the prepreg and core layers described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. Where the powder coated material also comprises a thermoplastic material, the thermoplastic material of the powder coated material may be the same material as that selected for use in the prepreg or core layer or may be different. The thermoplastic material used to form the prepreg or core layer can be used in powder form, resin form, rosin form, fiber form or other suitable forms. The thermoplastic material of the powder coated material is typically used in particle form though other forms which can be powder coated can also be used. Illustrative thermoplastic materials in various forms are described herein and are also described, for example in U.S. Publication Nos. 20130244528 and US20120065283. The exact amount of thermoplastic material present in the prepreg or core layer can vary and illustrative amounts range from about 20% by weight to about 80% by weight. The amount of thermoplastic material present in the powder coated material may be around 20% to about 99%, more particularly, about 50% to about 99%, based on the weight of the powder coated material.

In other configurations, the articles described herein may comprise a prepreg or core layer comprising a thermoplastic materials and reinforcing fibers in combination with a powder coated material which comprises a non-thermoplastic material. In some instances, the powder coated material consists essentially of a non-thermoplastic material. In other instances, the powder coated material consists of a non-thermoplastic material. Illustrative non-thermoplastic materials include thermosetting materials such as thermosetting polyurethanes, metals, non-thermoplastic adhesive materials and non-thermoplastic materials which can adhere to at the prepreg or core layer to at least some degree but do not necessarily provide suitable adhesive strength to be considered an adhesive. Where a thermosetting material powder is used instead of a thermoplastic material or in addition to a thermoplastic material, the amount of thermosetting material in the powder coated material may be greater than 0% up to about 99% by weight of the powder coated layer, e.g., around 20% to about 99% by weight of the powder coated layer, more particularly, about 50% to about 99%, e.g. about 80% to about 99%, based on the weight of the powder coated layer.

In certain examples, the fibers of the prepregs and core layers described herein can comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material. In some configurations, the fiber content in the prepreg may be from about 20% to about 90% by weight of the prepreg, more particularly from about 30% to about 70%, by weight of the prepreg. Typically, the fiber content of a composite article comprising the prepreg varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In some configurations, the prepreg or core layer may be a substantially halogen free or halogen free prepreg or core layer to meet the restrictions on hazardous substances requirements for certain applications. In other instances, the prepreg or core layer may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and core layers may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the prepreg or core layer), more particularly about 1 weight percent to about 13 weight percent, e.g., about 5 weight percent to about 13 weight percent. If desired, two different halogenated flame retardants may be added to the prepregs or core layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepreg or core layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg or core layer), more particularly about 1 weight percent to about 13 weight percent, e.g., about 5 weight percent to about 13 weight percent based on the weight of the prepreg or core layer. If desired, two different substantially halogen free flame retardants may be added to the prepreg or core layer. In certain instances, the prepreg or core layers described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of present may be about 0.1 weight percent to about 20 weight percent (based on the weight of the prepreg or core layer), more particularly about 1 weight percent to about 15 weight percent, e.g., about 2 weight percent to about 14 weight percent based on the weight of the prepreg or core layer. The flame retardant agents used in the prepreg or core layers described herein can be added to the mixture comprising the thermoplastic material and fibers (prior to disposal of the mixture on a wire screen or other processing component) or can be added after the prepreg or core layer is formed.

In other configurations, the prepreg or core layer may be substantially free of any flame retardants, and one or more flame retardant materials can be present in the powder coated layer disposed on the prepreg or core layer. For example, the powder coated layer may comprise a thermoplastic material or a non-thermoplastic material, either of which can function to at least some extent as an adhesive, in combination with one or more flame retardant materials. The flame retardant materials in the powder coated layer are typically present in a flame retardant amount, which may vary depending on the other components present in the article. In some instance, a flame retardant skin may be present in the article in addition to the presence of a powder coated layer comprising a flame retardant material.

In certain configurations, the prepregs and core layers described herein can be used to provide articles comprising a porous core. In certain examples, the porous core comprises one or more thermoplastic materials and a plurality of fibers that can be held in place by the formed thermoplastic material in a web or network structure to provide a plurality of open cells, void space or a web in the core. The core may be formed as described herein, e.g., by disposing the dispersion on a wire screen using a suitable laying process followed by compressing and/or curing of the thermoplastic material of the core. A powder coated layer can then be disposed onto a surface of the porous core, which may still be in a "soft" state or may be fully formed prior to disposal of the powder coated material onto the surface of the porous core. In other instances, a skin can then be coupled to the porous core through the powder coated layer, which can act to provide increase adhesion between the porous core and the skin. If desired and as described in more detail below, an additional skin or other surface layers can then be added to the first skin layer for additional chemical, physical or aesthetic functionality.

In certain embodiments, the formed porous core generally comprises a substantial amount of open cell structure such that void space is present in the core. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 5-30%, 5-40%, 5-50%, 5-60%, 5-70%, 5-80%, 5-90%, 5-95%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core comprises a porosity or void content of greater than 0%, e.g., is not fully consolidated, up to about 95%. Unless otherwise stated, the reference to the core comprising a certain void content or porosity is based on the total volume of the core and not necessarily the total volume of the core plus any other materials or layers coupled to the core. Compared to a prepreg or not fully formed core layer, the porosity of the core can be the same or can be different. For example, in many instances, a prepreg can be processed into a porous core by passing a prepreg through a set of rollers or by pressing one surfaces of the prepreg. In such instances, the porosity of the core may be different than the porosity of the prepreg, e.g., can be lower. In some instances, the porosity of the core is intentionally selected to be less than a comparable prepreg to provide for increased lofting of the core into a final formed article or product. For example, some of the materials present in the fully formed core can expand to increase the overall volume, e.g., thickness, of the core upon lofting. In certain configurations, the thermoplastic material of the core may be effective to loft, whereas in other configurations one or more lofting agents such as microspheres or other materials may be present to increase the overall thickness of the core upon lofting. For example, lofting agents such as microspheres or expandable graphite materials may be added to the prepregs or core to permit adjustment of the overall thickness of the prepreg or core. Without wishing to be bound by any particular theory, as the prepreg or core is heated, the lofting agent may function to increase the overall thickness of the prepreg or core. If desired, the prepregs or cores with the lofting agents may be compressed to permit an end user to apply heat to expand the prepreg or core thickness to a desired amount. Depending on the end use of the prepreg or core, it may be desirable to have different overall thickness for different types of articles.

Figure 7:
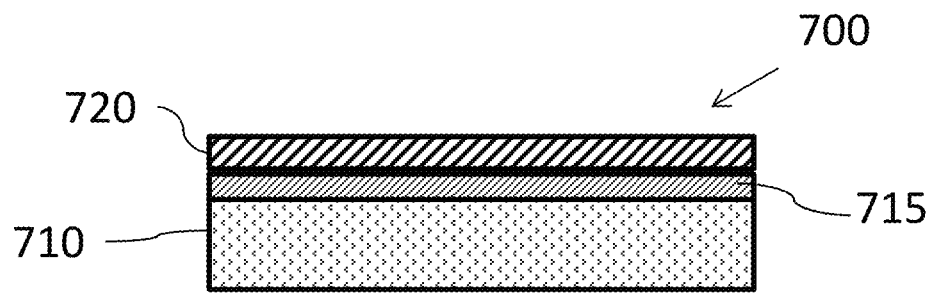
FIG. 7 is an illustration of an article comprising a core, a powder coated layer and a skin on the powder coated layer, in accordance with certain examples.

In certain embodiments, the prepregs or cores described herein may comprise one or more skins disposed on a surface of the prepreg or core to provide an article. Referring to FIG. 7, an article 700 comprises a prepreg or core 710 that comprises a thermoplastic material and a plurality of fibers. The article 700 comprises a powder coated layer 715 disposed on the prepreg or core 710. The article 700 also comprises a first skin 720 disposed on the powder coated layer 715. The skin 720 may comprise an open cell structure or a closed cell structure. In certain configurations, the skin 720 may comprise, for example, a film (e.g., thermoplastic film or elastomeric film), a frim, a scrim (e.g., fiber based scrim), a paper, a foil, a woven fabric, a non-woven fabric, a foam, or be present as an inorganic coating, an organic coating, a thermoplastic coating or a thermosetting material coating disposed on the powder coated layer 715. In other instances, the skin 720 may comprise a limiting oxygen index greater than about 22, as measured per ISO 4589 dated 1996. Where a thermoplastic film is present as (or as part of) the skin 720, the thermoplastic film may comprise at least one of polyolefin, poly(ether imide), poly(ether ketone), poly(ether-ether ketone), poly(phenylene sulfide), poly (arylene sulfone), poly(ether sulfone), poly(amide-imide), poly(1,4-phenylene), polycarbonate, nylon, and silicone. Where a fiber based scrim is present as (or as part of) the skin 720, the fiber based scrim may comprise at least one of glass fibers, aramid fibers, graphite fibers, carbon fibers, inorganic mineral fibers, metal fibers, polymer fibers metalized synthetic fibers, and metalized inorganic fibers. Where a thermosetting material coating is present as (or as part of) the skin 720, the coating may comprise at least one of unsaturated polyurethanes, vinyl esters, phenolics and epoxies. Where an inorganic coating is present as (or as part of) the skin 720, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 720, the non-woven fabric may comprise a thermoplastic material, a thermal setting binder, inorganic fibers, polymer fibers, metal fibers, metallized inorganic fibers and metallized synthetic fibers. The prepreg or core 710 may comprise any of the materials described herein in connection with prepregs and cores, e.g., a thermoplastic material, reinforcing fibers and an optional flame retardant material. If desired, the skin 720 may comprise a flame retardant material as well. The powder coated layer 715 may comprise a thermoplastic material or a non-thermoplastic material, e.g., a non-thermoplastic polyurethane powder coated material, which can, for example, function to increase adhesion between the core layer 710 and the skin 720. While not shown, an additional powder coated layer can be present an opposite surface of the core layer 710. In addition, another powder coated layer can be disposed on top of the skin 720 if desired.

Figure 8:
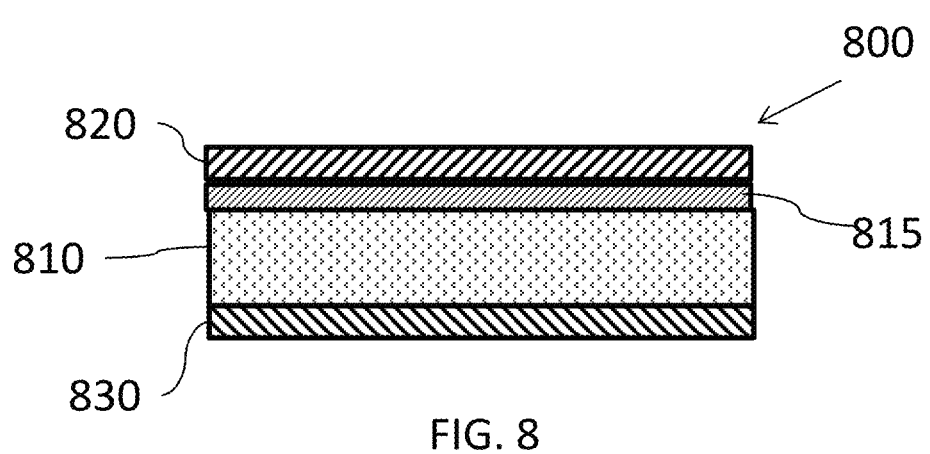
FIG. 8 is an illustration of an article comprising a core, a powder coated layer and a skin on the powder coated layer and an additional skin on an opposite surface of the core, in accordance with certain examples.

In certain configurations, the prepregs and cores described herein can be used to provide an article comprising a skin on each side of the prepreg or core. Referring to FIG. 8, an article 800 is shown comprising a prepreg or core 810, a powder coated layer 815 disposed on the core 810, a first skin 820 disposed on the powder coated layer 815 and a second skin 830 disposed on a surface of the prepreg or core 810. The prepreg or core 810 may comprise any of the materials described herein in connection with prepregs and cores, e.g., a thermoplastic material, reinforcing fibers and an optional flame retardant material. Each of the first skin 820 and the second skin 830 can be independently selected from a film (e.g., thermoplastic film or elastomeric film), a frim, a scrim (e.g., fiber based scrim), a foil, a paper, a woven fabric, a non-woven fabric, a foam, or be present as an inorganic coating, an organic coating, a thermoplastic coating or a thermosetting material coating. In other instances, the skin 820 or the skin 830 (or both) may comprise a limiting oxygen index greater than about 22, as measured per ISO 4589 dated 1996. Where a thermoplastic film is present as (or as part of) the skin 820 or the skin 830 (or both), the thermoplastic film may comprise at least one of polyolefin, poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 820 or the skin 830 (or both), the fiber based scrim may comprise at least one of glass fibers, aramid fibers, graphite fibers, carbon fibers, inorganic mineral fibers, metal fibers, polymer fibers, metalized synthetic fibers, and metalized inorganic fibers. Where a thermosetting material coating is present as (or as part of) the skin 820 or the skin 830 (or both), the coating may comprise at least one of unsaturated polyurethanes, vinyl esters, phenolics and epoxies. Where an inorganic coating is present as (or as part of) the skin 820 or the skin 830 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 820 or the skin 830 (or both), the non-woven fabric may comprise a thermoplastic material, a thermal setting binder, inorganic fibers, polymer fibers, metal fibers, metallized inorganic fibers and metallized synthetic fibers. If desired, one or both of the skins 820, 830 may comprise a flame retardant material. As noted herein, one or both of the skins 820, 830 may comprise an open cell structure or a closed cell structure. The powder coated layer 815 may comprise a thermoplastic material or a non-thermoplastic material, e.g., a non-thermoplastic polyurethane powder coated material, which can, for example, function to increase adhesion between the core layer 810 and the skin 820. While not shown, an additional powder coated layer can be present between the core layer 810 and the skin 830. In addition, another powder coated layer can be disposed on top of the skin 820 or the skin 830 or both if desired.

Figure 9:
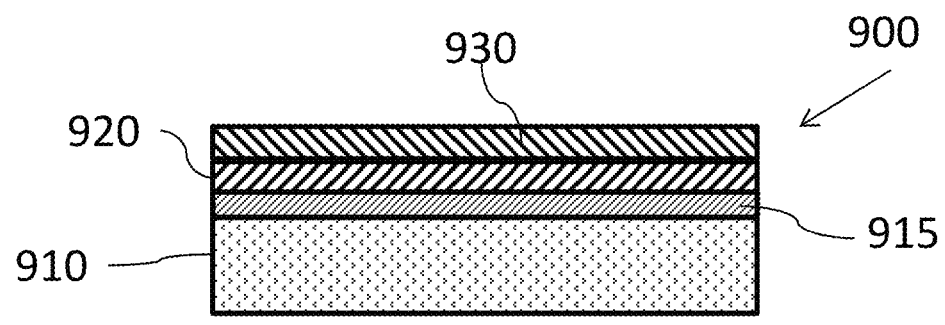
FIG. 9 is an illustration of an article comprising a core, a powder coated layer, a skin on the powder coated layer, and a decorative layer on the skin in accordance with certain examples.

In certain instances, an article can comprise a prepreg or core, at least one skin disposed on the prepreg or core and a decorative or cover layer disposed on the skin. Referring to FIG. 9, an article 900 is shown comprising a prepreg or core 910, a powder coated layer 915 disposed on the prepreg or core 910, a skin 920 disposed on the powder coated layer 915 and another layer 930, e.g., a decorative layer or other layer which can be positioned on the outer surface of the article 900 or may be covered by other layers, disposed on the skin 920. The prepreg or core 910 may comprise any of the materials described herein in connection with prepregs and cores, e.g., a thermoplastic material, reinforcing fibers, microspheres, etc. The skin 920 may comprise, for example, a film (e.g., thermoplastic film or elastomeric film), a frim, a scrim (e.g., fiber based scrim), a foil, a paper, a woven fabric, a non-woven fabric, a foam, or be present as an inorganic coating, an organic coating, a thermoplastic coating or a thermosetting material coating. In other instances, the skin 920 may comprise a limiting oxygen index greater than about 22, as measured per ISO 4589 dated 1996. Where a thermoplastic film is present, the thermoplastic film may comprise at least one of polyolefin, poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present, the fiber based scrim may comprise at least one of glass fibers, aramid fibers, graphite fibers, carbon fibers, inorganic mineral fibers, metal fibers, polymer fibers, metalized synthetic fibers, and metalized inorganic fibers. Where a thermosetting material coating is present, the coating may comprise at least one of unsaturated polyurethanes, vinyl esters, phenolics and epoxies. Where an inorganic coating is present, the inorganic coating may comprise minerals containing cations selected from Ca, Mg, Ba, Si, Zn, Ti and Al or may comprise at least one of gypsum, calcium carbonate and mortar. Where a non-woven fabric is present, the non-woven fabric may comprise a thermoplastic material, a thermal setting binder, inorganic fibers, polymer fibers, metal fibers, metallized inorganic fibers and metallized synthetic fibers. The decorative layer 930 may be formed, e.g., from a thermoplastic film of polyvinyl chloride, polyolefins, thermoplastic polyesters, thermoplastic elastomers, or the like. The decorative layer 930 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 930 may also be produced using spunbond, thermal bonded, spun lace, melt-blown, wet-laid, and/or dry-laid processes. In some configurations, the skin 920 may comprise an open cell structure or a closed cell structure. While not shown an additional powder coated layer may be present between the skin 920 and the decorative layer 930. The powder coated layer 915 may comprise a thermoplastic material or a non-thermoplastic material, e.g., a non-thermoplastic polyurethane powder coated material, which can, for example, function to increase adhesion between the core layer 910 and the skin 920. In addition, another powder coated layer can be disposed on top of the layer 930 if desired.

Figure 10:
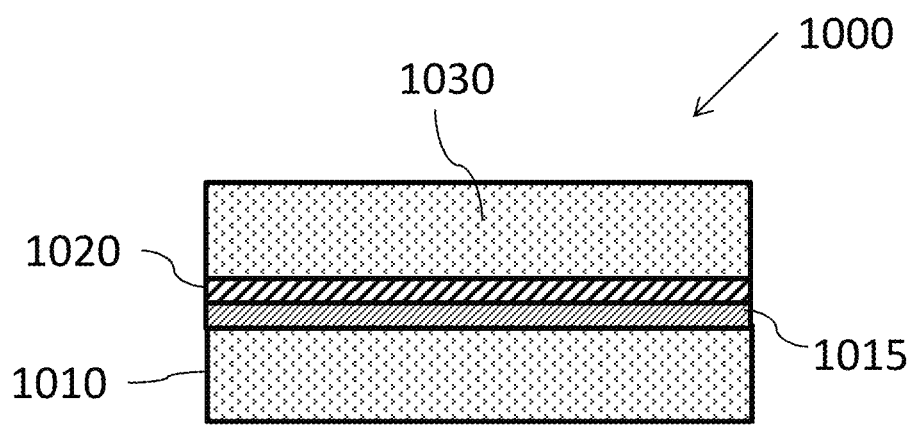
FIG. 10 is an illustration of an article comprising two or more cores separated by a powder coated layer and skin, in accordance with certain embodiments.

In certain configurations, two or more prepregs or cores can be coupled to each other through an intervening or intermediate layer such as, for example, a combination of a powder coated layer and a skin. Referring to FIG. 10, an article 1000 comprises a prepreg or core 1010 coupled to a prepreg or core 1030 through a powder coated layer 1015 and a skin 1020. Each of the prepregs or cores 1010, 1030 may be the same or may be different. In some instances, the thermoplastic materials and fibers of the prepregs or cores 1010, 1030 are the same, but the loading of thermoplastic material or fibers present in the prepregs or cores 1010, 1030 is different. If desired, one or more suitable flame retardant agents, e.g., halogenated or non-halogenated flame retardant agents may be present in one or both of the cores 1010, 1030. While the thickness of the prepregs or cores 1010, 1030 is shown as being about the same in FIG. 10, the thickness of the prepregs or cores 1010, 1030 can vary. Where an article comprising a "thick" core is desired, it may be desirable to couple two "thin" core layers to each other through skin layer 1020 and the powder coated layer 1015. In some configurations, one of the prepregs or cores 1010, 1030 may comprise a lofting agent, e.g., microspheres. The skin 1020 desirably may comprise an open cell structure or a closed cell structure. For example, the skin 1020 may comprise a film (e.g., thermoplastic film or elastomeric film), a frim, a scrim (e.g., fiber based scrim), a foil, a paper, a woven fabric, a non-woven fabric, a foam, or be present as an inorganic coating, an organic coating, a thermoplastic coating or a thermosetting material coating. In other instances, the skin 1020 may comprise a limiting oxygen index greater than about 22, as measured per ISO 4589 dated 1996. Where a thermoplastic film is present, the thermoplastic film may comprise at least one of polyolefin, poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 1020, the fiber based scrim may comprise at least one of glass fibers, aramid fibers, graphite fibers, carbon fibers, inorganic mineral fibers, metal fibers, polymer fibers, metalized synthetic fibers, and metalized inorganic fibers. Where a thermosetting material coating is present as or in the skin 1020, the coating may comprise at least one of unsaturated polyurethanes, vinyl esters, phenolics and epoxies. Where an inorganic coating is present as or in the skin 1020, the inorganic coating may comprise minerals containing cations selected from Ca, Mg, Ba, Si, Zn, Ti and Al or may comprise at least one of gypsum, calcium carbonate and mortar. Where a non-woven fabric is present as or in the layer 1020, the non-woven fabric may comprise a thermoplastic material, a thermal setting binder, inorganic fibers, polymer fibers, metal fibers, metallized inorganic fibers and metallized synthetic fibers. While not shown, a decorative layer can be coupled to either (or both) of the prepregs or cores 1010, 1030. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. If desired, the decorative layer may comprise a closed cell structure or an open cell structure. The powder coated layer 1015 may comprise a thermoplastic material or a non-thermoplastic material, e.g., a non-thermoplastic polyurethane powder coated material, which can, for example, function to increase adhesion between the core layer 1010 and the skin 1020. In addition, another powder coated layer can be disposed on top of the core 1030 if desired. Further, a powder coated layer may be present between the skin 1020 and the core 1030.

Figure 11:
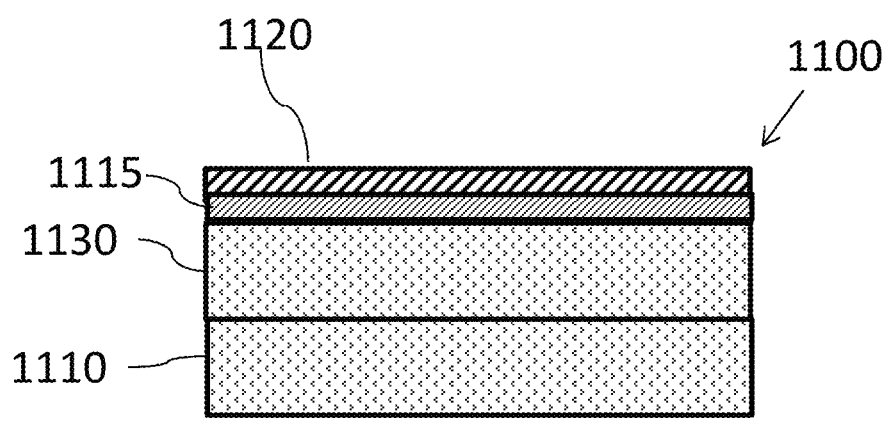
FIG. 11 is an illustration of two or more cores with a powder coated layer on one of the cores, in accordance with certain instances.

In certain embodiments, two or more cores can be coupled to each other and then a skin may be disposed on one surface of the cores. Referring to FIG. 11, an article 1100 comprising a core 1110, another core 1130 coupled to the core 1130 and a skin 1120 coupled to the core 1130 coupled through a powder coated layer 1115 is shown. Each of the cores 1110, 1130 may be the same or may be different. In some instances, the thermoplastic materials and fibers of the cores 1110, 1130 are the same, but the exact amounts of thermoplastic materials and/or fibers may be different in the cores 1110, 1130 is different. If desired, one or more suitable flame retardant agents, e.g., halogenated or non-halogenated flame retardant agents may be present in one or both of the prepregs or cores 1110, 1130. While the thickness of the prepregs or cores 1110, 1130 is shown as being about the same in FIG. 11, the thickness of the prepregs or cores 1110, 1130 can vary. It may be desirable to build up a composite article using successive thin core layers to provide a desired overall core thickness. In some configurations, one of the prepregs or cores 1110, 1130 may comprise a lofting agent such as, for example, an expandable graphite material or microspheres or other materials. The skin 1120 may comprise, for example, a film (e.g., thermoplastic film or elastomeric film), a frim, a scrim (e.g., fiber based scrim), a foil, a paper, a woven fabric, a non-woven fabric, a foam, or be present as an inorganic coating, an organic coating, a thermoplastic coating or a thermosetting material coating. In other instances, the skin 1120 may comprise a limiting oxygen index greater than about 22, as measured per ISO 4589 dated 1996. Where a thermoplastic film is present as or in the skin 1120, the thermoplastic film may comprise at least one of polyolefin, poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 1120, the fiber based scrim may comprise at least one of glass fibers, aramid fibers, graphite fibers, carbon fibers, inorganic mineral fibers, metal fibers, polymer fiber, metalized synthetic fibers, and metalized inorganic fibers. Where a thermosetting material coating is present as or in the skin 1120, the coating may comprise at least one of unsaturated polyurethanes, vinyl esters, phenolics and epoxies. Where an inorganic coating is present as or in the skin 1120, the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 1120, the non-woven fabric may comprise a thermoplastic material, a thermal setting binder, inorganic fibers, polymer fibers, metal fibers, metallized inorganic fibers and metallized synthetic fibers. Depending on the final configuration of the article 1100, the skin 1120 may be an open cell skin to permit, for example, sound energy to pass through the skin or may be a closed cell skin to reflect sound energy back into the cores 1110, 1130. While not shown, a decorative layer can be coupled to the skin 1120 or to a surface of the core 1110. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. The powder coated layer 1115 may comprise a thermoplastic material or a non-thermoplastic material, e.g., a non-thermoplastic polyurethane powder coated material, which can, for example, function to increase adhesion between the core layer 1130 and the skin 1120. In addition, another powder coated layer can be disposed on top of the skin 1120 if desired. Further, a powder coated layer may be present on the core layer 1110.

Figure 12:
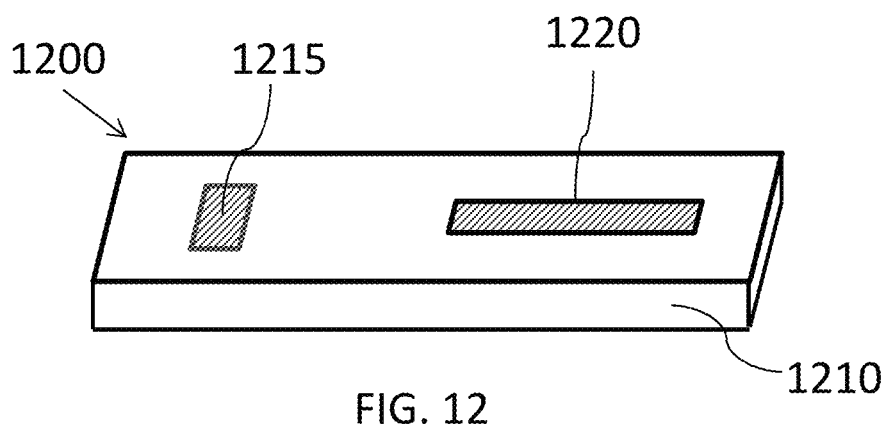
FIG. 12 is an illustration of an article comprising strips of powder coated material on a core, in accordance with certain examples.

In some configurations, the powder coated material may be disposed on the core layer in strips or areas rather than an entire layer. Referring to FIG. 12, an article 1200 comprises a core 1210 with a first area 1215 of powder coated material disposed on the core 1210 and a second area 1220 of powder coated material disposed on the core. While not shown, a skin layer, decorative layer, etc. can be disposed on the areas 1215, 1220 to couple those layers to the core layer 1210. The areas 1215, 1220 can be the same or can be different, e.g., may comprise the same or different materials. In some instances, areas of powder coated material may be disposed at the edges of the top surface of the core 1210 to provide increase adhesion at those areas. For example, if a skin or other layer is coupled to the core 1210, the skin may peel away from the core 1210 at the edges during processing of article 1200. To increase the peel strength between the skin and the core 1210 at the edges, the powder coated areas can be deposited only at the edges or at the edges and other areas on the surface of the core 1210. In some examples, the powder coated material at the edges may be different than the powder coated material present at other areas on the core 1210. For example, polyurethane powder coated material may be present at the edges while non-polyurethane based materials may be present on the core 1210 in areas other than the edges. The powder coated areas 1215, 12220 may independently comprise a thermoplastic material or a non-thermoplastic material, e.g., a non-thermoplastic polyurethane powder coated material, which can, for example, function to increase adhesion between the core layer 1210 and another layer. In addition, another powder coated layer can be disposed on top of the areas 1215, 1220 if desired. Further, a powder coated layer may be present on an opposite surface of the core 1210.

Figure 13:
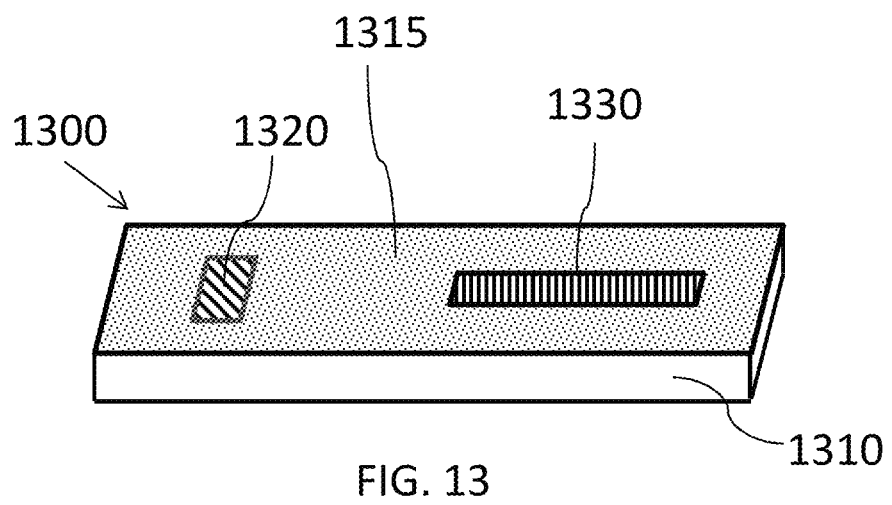
FIG. 13 is an illustration of an article comprising strips of a surface layer disposed on a powder coated layer, in accordance with certain configurations.

In certain embodiments, strips of materials can be disposed on a prepreg or core comprising a powder coated layer. Referring to FIG. 13, an article 1300 comprising a prepreg or core 1310 with strips 1320, 1330 disposed on a powder coated layer 1315 present on the prepreg or core 1310 is shown. If desired, such strips can be present on any of the illustrative embodiments shown in FIGS. 1-12. The strips 1320, 1330 may be the same or may be different. In some instances, the strips 1320, 1330 may comprise a flame retardant material as noted herein. In some instances, the strips 1320, 1330 may independently take the form of a prepreg or core as described herein. In other configurations, the strips may take the form of a skin or layer as described herein. In certain instances, the strips can be disposed, for example, on areas of the article 1300 where a differential thickness is desired. In other configurations, strips comprising flame retardant material may be disposed at areas where increased or enhanced flame retardancy is desired. In additional configurations, the strips may be disposed at areas where enhanced bonding is desired.

In some embodiments, the prepregs and cores may include additional materials or additives to impart desired physical or chemical properties. For example, the articles may be colored or dyed to provide a desired color, texture, pattern, etc. For example, one or more dyes, texturizing agents, colorants, viscosity modifiers, smoke suppressants, synergistic materials, lofting agents, particles, powders, biocidal agents, foams or other materials can be mixed with or added to the prepregs or the cores to impart a desired color, texture or properties. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. For example, a synergist that enhances flame retardancy may be present.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein can be configured as (or used in) a glass mat thermoplastic composite (GMT) or a light weight reinforced thermoplastic (LWRT). One such LWRT is prepared by HANWHA AZDEL, Inc. and sold under the trademark SUPERLITE™ material. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT be a porous GMT or the LWRT, e.g., one with a porosity of about 20 percent to about 90 percent by volume, more particularly about 40 percent to about 80 percent by volume. In some examples, the overall thickness of the GMT or LWRT may be about 25 mm or less post lofting, 20 mm or less post lofting, greater than 3 mm pre-lofted or greater than 6 mm pre-lofted. In some instances, the pre-lofted thickness may be between about 3 mm and about 7 mm, and the post-lofted thickness may be between about 10 mm and about 25 mm.

Figure 14:
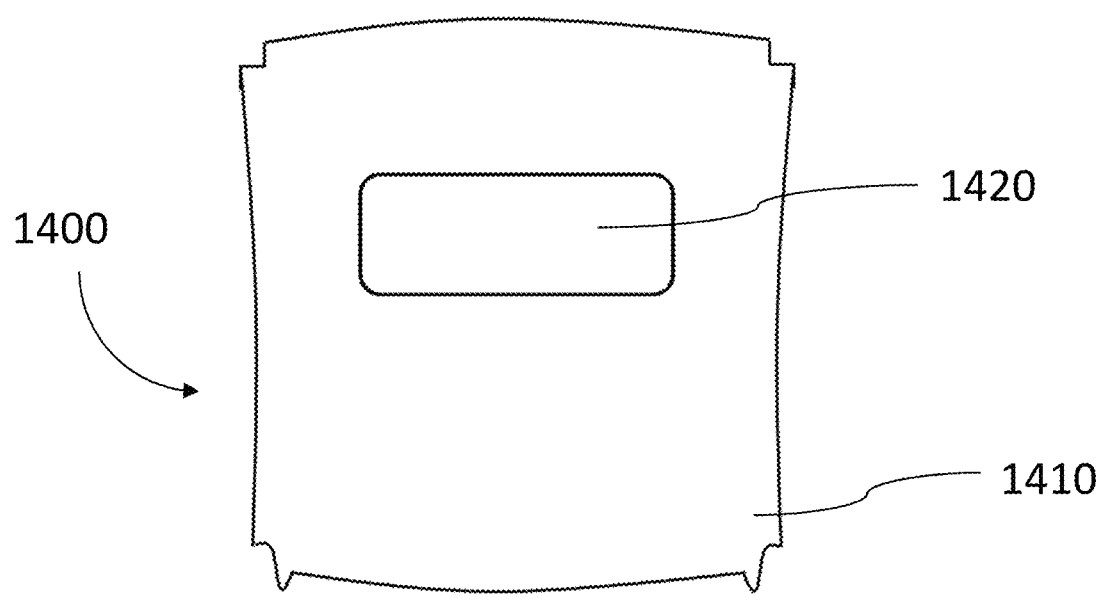
FIG. 14 is a top view illustration of a vehicle headliner, in accordance with certain instances.

In certain configurations, the prepregs or cores described herein in combination with a powder coated layer can be used to provide a vehicle headliner. Illustrative vehicles include, but are not limited to, automotive vehicles, trucks, trains, subways, recreational vehicles, aircraft, ships, submarines, space craft and other vehicles which can transport humans or cargo. In some instances, the headliner typically comprises at least one prepreg or core layer comprising a powder coated layer thereon and a decorative layer, e.g., a decorative fabric, disposed on the powder coated layer. The decorative layer, in addition to being aesthetically and/or visually pleasing, can also enhance sound absorption and may optionally include foam, insulation or other materials. An illustration of a top view of a headliner is shown in FIG. 14. The headliner 1400 comprises a body 1410 and an opening 1420, e.g., for a sunroof, moonroof, etc., though more than a single opening may be present if desired. The body of the headliner 1410 can be produced by initially heating a prepreg or core layer comprising powder coated layer to a desired temperature in an infrared oven, e.g., about 180-230° C., and then moved to a press with matching male and female mold halves where the decorative fabric is put on the powder side and pressed with the desired mold to convert the article into a headliner. The opening 1420 may then be provided by trimming the headliner 1400. In other configurations, the decorative fabric itself may instead comprise the powder coated layer which is placed on the heated prepreg or core layer and molded as noted herein. The "C" surface or roof side of the headliner typically consists of a PET non-woven scrim layer for handling purposes. The overall shape and geometry of the headliner may be selected based on the area of the vehicle which the headliner is to be coupled. For example, the length of the headliner can be sized and arranged so it spans from the front windshield to the rear windshield, and the width of the headliner can be sized and arranged so it spans from the left side of the vehicle to the right side of the vehicle.

Figure 15A:
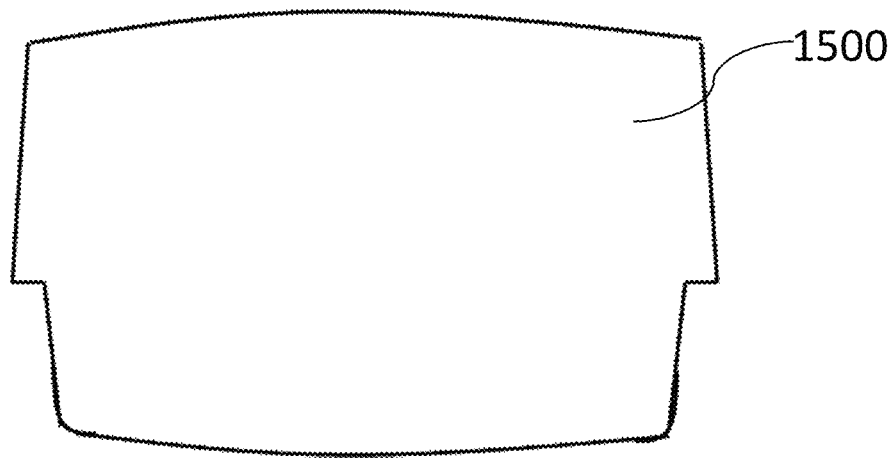
FIG. 15A is an illustration of an underbody shield.
Figure 15B:
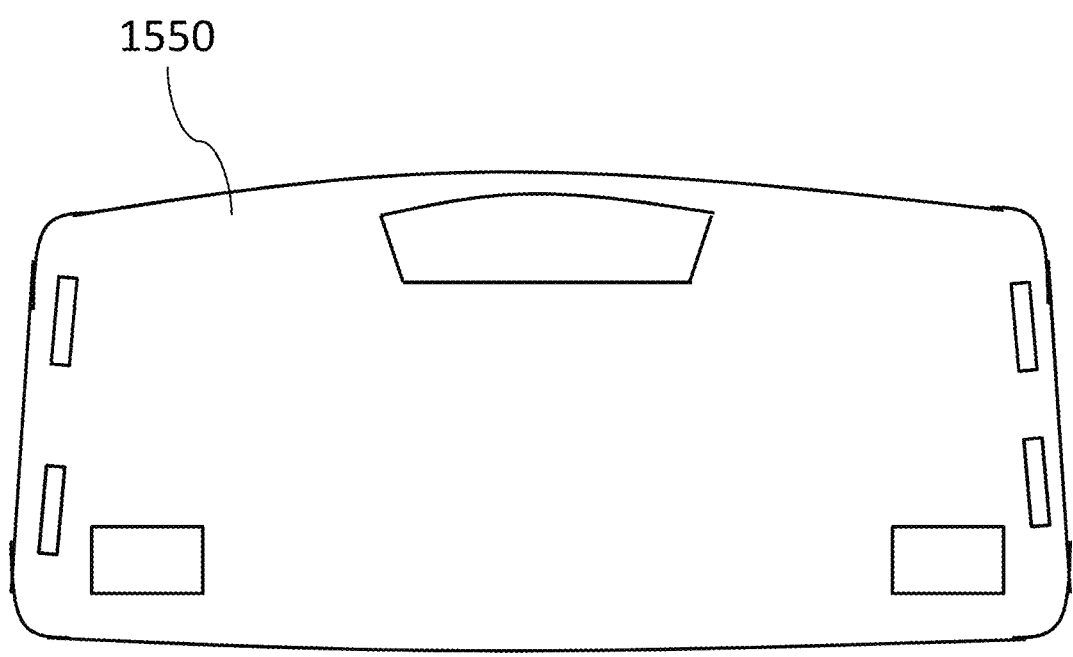
FIG. 15B is a top view illustration of rear window trim, in accordance with certain examples.

In certain instances, similar methods can be used to produce underbody shields and rear window trim pieces or parts from the prepreg or core layer comprising the powder coated layer. An illustration of an underbody shield 1500 is shown in FIG. 15A, and an illustration of top view of a rear window trim 1550 is shown in FIG. 15B. The particular outer layers used in the underbody shield 1500 and the rear window trim 1550 may be different from the headliner. For example, the underbody shield may comprise a scrim or other outer layer to increase its durability and/or the acoustic characteristics. The inner surface of the underbody shield, e.g., which sits adjacent to the bottom of the engine may comprise one or more layer designed to absorb and/or retain automotive fluids such as motor oil, antifreeze, brake fluid or the like. While various openings are shown in the rear window trim 1550, the positions and geometries of these openings may vary. In addition, typical rear window trim decorative material may comprise a non-backed PET or PP carpet.

Figure 16:
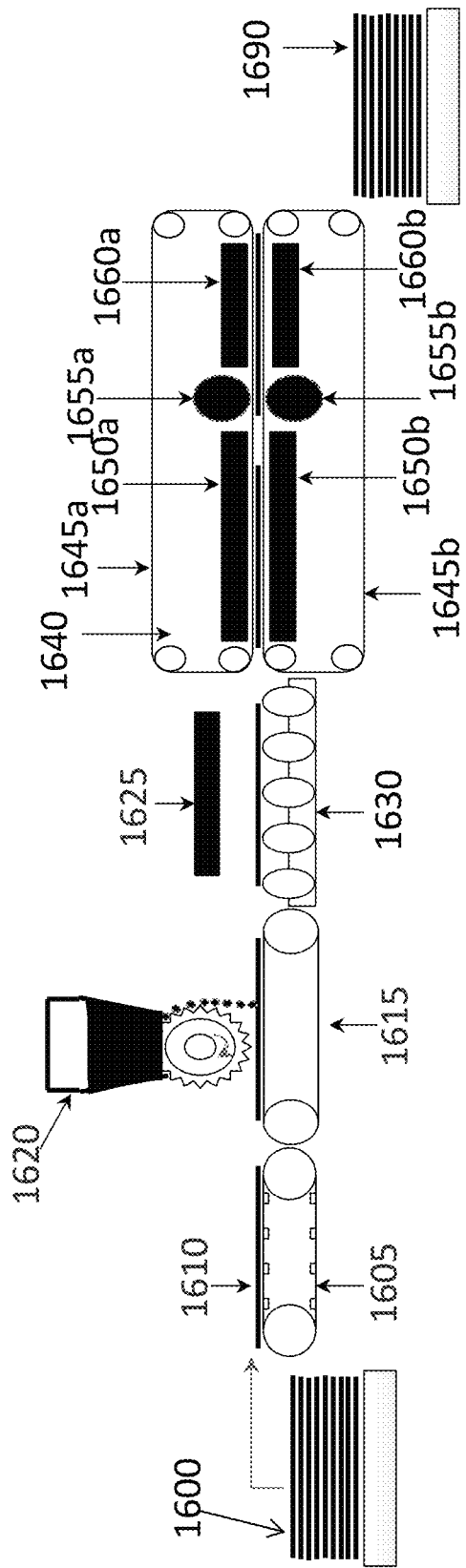
FIG. 16 is an illustration of a powder coating system which can be used to provide a powder coated layer on a prepreg or core, in accordance with some embodiments.

In producing core layers, prepregs and articles that include a powder coated layer, it may be desirable to first produce the core layer or prepreg and then powder coat the material onto a surface or surfaces of the core layer or prepreg. Referring to FIG. 16, a system is shown where a prepreg or core from plurality of prepregs or cores in a stack 1600 can be fed into a belt conveyor 1605. For example, a core layer 1610 comprising a thermoplastic material and reinforcing fibers in the form of a web is shown. The core 1610 is fed to a belt conveyor 1615 under a powder scattering unit 1620. The unit 1620 coats the powder onto a surface of the core 1610. The powder coated core is then passed to a roller conveyor 1630 positioned underneath a heater 1625, e.g., an infrared heater. Heating of the coated prepreg or core can also act to soften it if softening of the prepreg or core is desired. In other instances, a suitable temperature is selected to soften the powder coated material but not the prepreg or core. The article may then be passed to a flatbed press 1640 which includes belts 1645a, 1645b, heating sections 1650a, 1650b, nip rolls 1655a, 1655b and cooling sections 1660a, 1660b. The resulting composite article may exit the press 1640 and be stacked to form a plurality of powder coated articles shown in a stack 1690.

In certain embodiments, the exact form of the powder and devices used to dispense the powder onto the porous prepreg or core may vary. For example, the powder material may be present as particles, granules, pellets, etc. which are typically ground and/or sized to provide a desired average particle size. While the particle size may vary from material to material, illustrative average particle diameter sizes for the powder material are from about 50 microns to about 1000 microns, more particularly about 100 microns to about 750 microns, e.g., about 100 microns to about 500 microns, more particularly about 200 microns to about 500 microns or about 400 microns to about 500 microns. Average particle size may be determined, for example, using ASTM E2980 dated 2014 or other suitable tests.

In certain configurations, the powder material may be heated and/or softened prior to application to the surface of the prepreg or core. In other instances, however, the porous prepreg or core is heated and the powder material is disposed on the heated prepreg or core at ambient temperature. In addition, the prepreg or core may remain at ambient temperature during power coating, and, if desired, the resulting composite can be subsequently heated. While heating is not required, heating of the powder coated material can soften the material and permit better adherence of a skin, e.g., a surface layer or some other component, to the porous prepreg or core through the powder coated layer.

In some embodiments, the powder material can be sprayed, scattered or otherwise disposed on the surface of the prepreg or core. In some instances, a gas, e.g., an inert gas such as air, nitrogen or argon, can be used as a carrier for the powder material. Further an assist gas may be used to direct the powder material to certain areas or portions of the surface of the prepreg or core. In some instances, multiple sprays or passes of the powder material may be coated into the surface of the prepreg or core. The material deposited in different passes can be the same or can be different. For example, the chemical composition of the material disposed in successive passes or layers can be different, the particle size of the material disposed in successive passes or layer can be different, or both composition and particle size can be different in successive passes.

Figure 17:
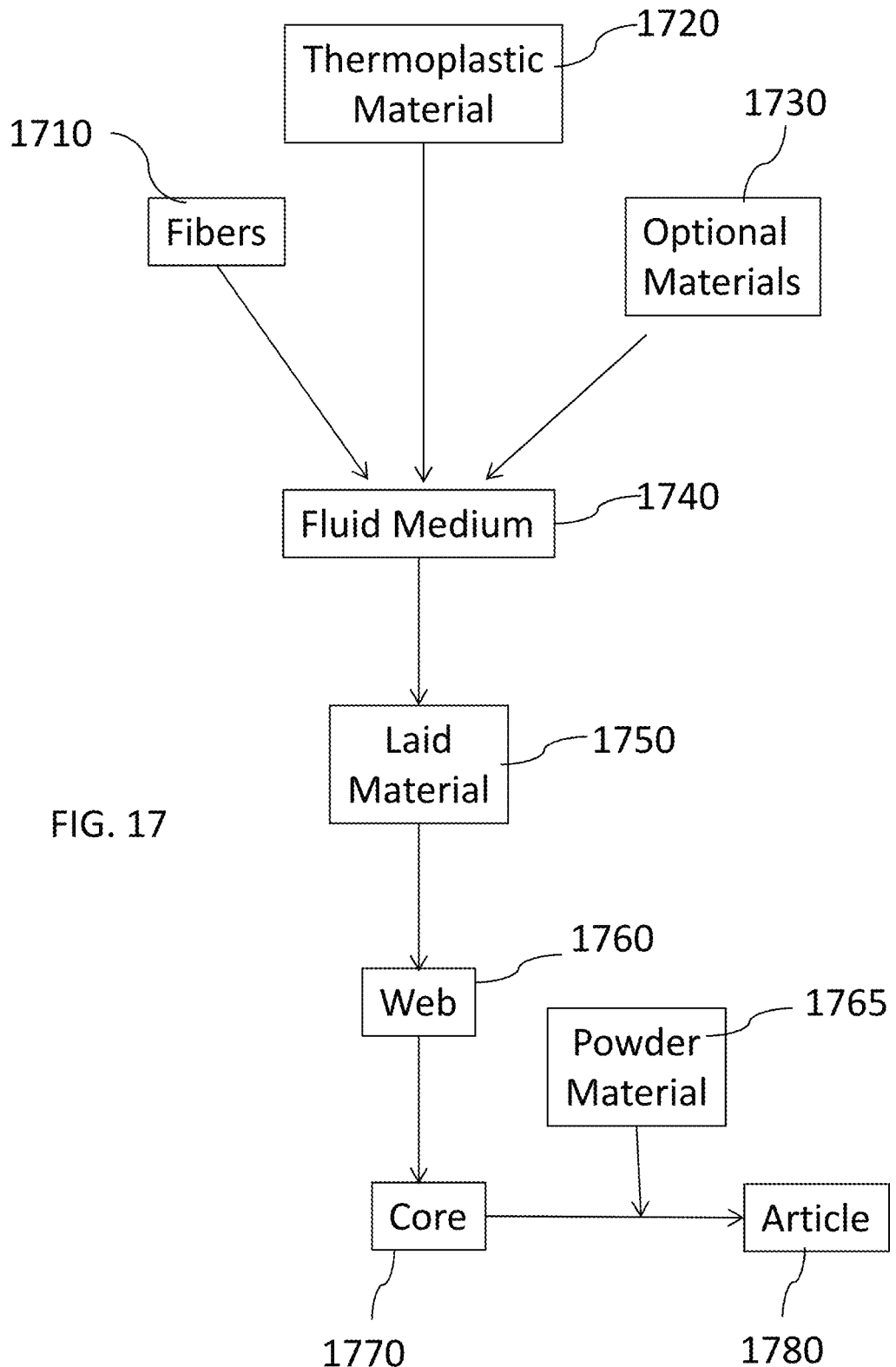
FIG. 17 is a block diagram of a process which can be used to produce an article, in accordance with certain examples.

In producing the prepregs and cores described herein, it may be desirable to use a wet-laid process. A block diagram showing the process steps is present in FIG. 17. For example, a liquid or fluid medium 1740 comprising dispersed material, e.g., thermoplastic material 1720, fibers 1710 and optional additional materials 1730, e.g., microspheres, flame retardants, etc., may be stirred or agitated in the presence of a gas, e.g., air or other gas. The dispersion may then be laid onto a support, e.g., a wire screen or other support material to provide a laid material 1750. If desired, the stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid material. Suction or reduced pressure may be provided to the web to remove any liquid from laid material to leave behind the thermoplastic material and any other materials that are present, e.g., fibers, additives, etc. The resulting web 1760 can be dried and optionally consolidated or pressed to a desired thickness prior to fully forming it to provide a desired prepreg or core 1770. While wet laid processes may be used, depending on the nature of the thermoplastic material, it may be desirable to instead use an air laid process, a dry blend process, a carding and needle process, or other known process that are employed for making non-woven products. In some instances, a powder material 1765 may be coated onto the core 1770 to provide an article 1780. While not shown, a skin, decorative layers, etc. may also be disposed onto the disposed powder material as noted elsewhere herein.

In certain examples, a prepreg or core in the form of a porous GMT can be produced. In certain instances, the GMT can be generally prepared using chopped glass fibers, a thermoplastic material, and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the high melt flow index resin. To produce the glass mat, a thermoplastic material, reinforcing materials, and/or other additives can be added or metered into a dispersing foam contained in an open top mixing tank fitted with an impeller. Without wishing to be bound by any particular theory, the presence of trapped pockets of air of the foam can assist in dispersing the glass fibers and the thermoplastic material. In some examples, the dispersed mixture of glass and resin can be pumped to a head-box located above a wire section of a paper machine via a distribution manifold. The foam, not the glass fiber or thermoplastic material, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, a powder coating may be applied to the web by passing the web underneath a nozzle or spray jet which can dispense the powder material. If desired, additional layers such as, for example, a non-woven and/or woven fabric layer may also be attached to the powder coated material on one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In certain embodiments, a method of producing a thermoplastic composite article is provided. The method may comprise disposing a skin on a powder coated layer directly disposed on the porous core layer, e.g., without any intervening barrier or film between the powder coated layer and the core layer. In some instances, the powder coated layer provides an interface between the porous core layer and is effective to adhere the skin to the porous core layer. For example, the skin may have a peel strength for the skin of at least 125 N/m in the machine direction and a peel strength of at least 125 N/m in the cross direction as tested by ASTM D903 Peel 180° dated 2010. In some examples, the thermoplastic material of the powder coated layer is different than a thermoplastic material of the porous core layer. For example, the thermoplastic material of the porous core layer may be a polyolefin, and the thermoplastic material of the powder coated may be a non-polyolefin, e.g., a polyurethane, polyamide, co-polyamide, etc. In some instances, the method comprises selecting a thermoplastic material of the powder coated layer and the thermoplastic material of the porous core layer to be a same material, and selecting an average particle size of the thermoplastic material of the powder coated layer to be larger than an average particle size of the thermoplastic material of the porous core layer. In some examples, the porous core layer can be compresses prior to disposing the powder coated layer on the porous core layer and/or after disposing the powder coated layer. For example, the thermoplastic composite article can be compressed after disposing the skin on the powder coated layer. If desired, the article may be processed by thermoforming, molding, shaping, trimming, cutting, sizing, etc. depending on the particular end use of the article. One or more additional skins, cover layers, decorative layers, coatings, or other materials can also be coupled to the article.

Certain examples are described below to illustrate better some of the novel aspects and configurations described herein.

Example 1

Several composite articles comprising a powder coated layer disposed on a core layer were prepared. Table 1 summarizes the different powder types used. Certain of these different powders were used separately in the other examples below.

TABLE 1

| Powder Material | Melt Flow Index (g/10 mm.) | Melting Point (deg. Celsius) | Particle Size Distribution (microns) |
| --- | --- | --- | --- |
| Polypropylene powder | 8 | 144 | 100-500 |
| Co-polyamide (Co-PA) powder | 19 | 124 | 200-500 |
| Thermoplastic Polyurethane (TPU) powder | 40 | 137 | 100-500 |

Example 2

A powder coating process was used to separately coat each of the powders of Example 1 onto a lightweight reinforced thermoplastic composite board (Superlite™ composite article). The process used a setup similar to that shown in FIG. 16. The lamination temperature used was 140-200 deg. Celsius. The line speed used was 5-30 m/minute. The nip gap distance used was 0.5-8 mm.

Example 3

The co-polyamide powder from Table 1 was coated onto a Superlite™ board which comprises polypropylene and glass fibers. The boards were then placed in a heated thermoformer where a fabric (bi-laminate or bi lam fabric in this example) was added to the side of the Superlite™ board containing the powder or the film. The composite was then molded to different thicknesses including 2.25 mm thick (Table 2) and 3.0 mm thick (Table 3). The peel strength of the fabric layer coupled to the powder coated layer or control film was measured according to the ASTM D903 Peel 180° dated 2010. The basis weight of the Superlite™ board was 900 gsm.

TABLE 2

| Sample | Avg. Basis Weight (gsm) | Avg. Ash (%) | Peel Strength MD (N/m) | Peel Strength CD (N/m) |
|---|---|---|---|---|
| Superlite ™ board + Co-PA Powder 80 gsm | 1000 | 49.5 | 318.9 | 369.5 |
| Superlite ™ board + PP/Co-PA control 70 gsm film | 990 | 50.0 | 235.0 | 291.0 |

In comparing the properties to the 70 gsm film control (no powder coated layer), the peel strength measurements are consistent with an 80 gsm Co-PA powder coated layer providing better peel strength in the machine direction and cross direction than the 70 gsm film at a comparable basis weight.

TABLE 3

| Sample | Avg. Basis Weight (gsm) | Avg. Ash (%) | Peel Strength MD (N/m) | Peel Strength CD (N/m) |
|---|---|---|---|---|
| Superlite ™ board + Co-PA Powder 80 gsm | 1000 | 49.5 | 259.1 | 230.9 |
| Superlite ™ board + PP/Co-PA control 70 gsm film | 990 | 50.0 | 196.0 | 193.7 |

In comparing the properties to the 70 gsm film control (no powder coated layer), the peel strength measurements are consistent with an 80 gsm Co-PA powder coated layer providing better peel strength in the machine direction and cross direction than the 70 gsm film at a comparable basis weight and a comparable average ash content.

Example 4

Resistance to compression of the Superlite™ board with the Co-PA powder was also measured. The composite used was the same as the one used in Table 3 (80 gsm Co-PA powder layer). The results are shown in Table 4. The values in the table are the resulting thickness in mm after subjecting the board to the various weights listed in Table 4.

TABLE 4

| Sample | 0 lbs | 0.25 lbs | 0.5 lbs | 1.0 lbs | 2.0 lbs | 4.0 lbs | 8.0 lbs |
|---|---|---|---|---|---|---|---|
| Superlite ™ board + Co-PA powder 80 gsm | 6.1 | 3.5 | 2.9 | 2.4 | 2.0 | 1.7 | 1.8 |
| Superlite ™ board + PP/Co-PA control 70 gsm film | 5.8 | 3.3 | 2.8 | 2.5 | 2.0 | 1.8 | 1.6 |

In comparing the thickness change between the powder coated board and the board with the film control, the resulting board thicknesses are consistent with the powder coated board being compressed about the same amount at the different weights as the film control board.

Example 5

The Co-PA powder coated board was tested for peel strength in the machine direction after being subjected to various conditions. The results are shown in Table 5. Environmental cycle refers to the conditions specified in the Ford-BN 151-05 test dated 2010. The peel strength test used was the same as used in Example 3.

TABLE 5

| Conditions | Peel Strength (N/m) |
|---|---|
| Ambient Temperature | 444.3 |
| After heat Aging | 358.1 |
| After humidity aging | 303.3 |
| Environmental cycle | 334.6 |

The results were consistent with the peel adhesion of the powder coated samples being sufficient to meet desired specification.

Example 6

The polypropylene powder material from Table 1 was coated onto a Superlite™ board at different basis weights. The boards were then placed in a heated thermoformer where a fabric (a non-woven fabric in this example) was added to the side of the Superlite™ board containing the powder or the film. The composite was then molded to different thickness including 3.25 mm (Table 6) and 3.5 mm (Table 7). Certain physical properties of the boards were measured and compared to a control Superlite™ board which included a 98 gsm polypropylene (PP) film and the non-woven fabric. The basis weight of the Superlite™ board was 1000 gsm in Table 6 and 1300 gsm in Table 7. The peel strength was measured using is ASTM D903 Peel 180° dated 2010.

TABLE 6

| Sample | Avg. Basis Weight (gsm) | Avg. Ash (%) | Peel Strength MD (N/m) | Peel Strength CD (N/m) |
|---|---|---|---|---|
| Superlite ™ + PP powder 50 gsm | 1070 | 51.4 | 214.3 | 184.5 |
| Superlite ™ + PP powder 90 gsm | 1100 | 50.0 | 1287.0 | 631.9 |
| Superlite ™ + PP control 98 gsm film | 1118 | 49.2 | 816.2 | 504.1 |

In comparing the powder coated PP boards to the film control board, the results are consistent with the peel strength of the PP powder boards being the same as or greater than the film board at 90 gsm powder coating. The peel strength was less at the lower powder coating (50 gsm).

TABLE 7

| Sample | Avg. Basis Weight (gsm) | Avg. Ash (%) | Peel Strength MD (N/m) | Peel Strength CD (N/m) |
|---|---|---|---|---|
| Superlite ™ board + PP powder 70 gsm | 1390 | 51.4 | 396.7 | 407.5 |
| Superlite ™ board + PP control 98 gsm film | 1418 | 50.4 | 490.0 | 512.3 |

At a higher molding thickness, the 70 gsm powder coated material provided lower peel strengths than the 98 gsm control film. The peel strength values at the higher molding thickness are still acceptable for the powder coated boards.

Example 7

Resistance to compression of the Superlite™ board with the PP powder was also measured. The composites used were the same as the ones used in Table 7 (70 gsm PP powder layer). The results are shown in Table 8. The values in the table are the resulting thickness in mm after subjecting the board to the various weights listed in the table.

TABLE 8

| Sample | 0 lbs | 0.25 lbs | 0.5 lbs | 1.0 lbs | 2.0 lbs | 4.0 lbs | 8.0 lbs |
|---|---|---|---|---|---|---|---|
| Superlite ™ board + PP powder 70 gsm | 7.2 | 4.4 | 4.1 | 3.1 | 3.0 | 2.6 | 2.3 |
| Superlite ™ board + PP control 98 gsm film | 7.7 | 4.9 | 3.9 | 3.6 | 3.0 | 2.8 | 2.3 |

In comparing the thickness change between the powder coated board and the board with the control film, the resulting board thicknesses are consistent with the powder coated board being compressed about the same amount at the different weights as the film control board.

Example 8

The thermoplastic polyurethane (TPU) powder material from Table 1 was coated onto Superlite™ boards. The boards were then placed in a heated thermoformer where a fabric (a bilaminate fabric for Table 9) was added to the side of the Superlite™ board containing the powder or the film. The composite was then molded to a thickness of 3.0 mm. Certain physical properties of the boards were measured and compared to a control Superlite™ board which included a 70 gm and 80 gsm gsm PP/Co-PA film (Table 9) and the same type of fabric layer. The basis weight of the Superlite™ board was 1000 gsm in Tables 9. The peel strength was measured using ASTM D903 Peel 180° dated 2010.

TABLE 9

| Sample | Avg. Basis Weight (gsm) | Avg. Ash (%) | Peel Strength MD (N/m) | Peel Strength CD (N/m) |
|---|---|---|---|---|
| Superlite ™ + TPU powder 50 gsm | 1070 | 51.4 | 395.9 | 340.6 |
| Superlite ™ + PP/Co-PA control film 70 gsm | 1090 | 50.4 | 293.5 | 249.7 |
| Superlite ™ + PP/Co-PA control film 80 gsm | 1100 | 50.0 | 531.2 | 539.2 |

The results from Table 9 were consistent with the TPU powder coated board providing better peel strength than a 70 gsm control film board. The peel strength of the TPU powder coated board was not as good as the 80 gsm PP/Co-PA film control board, but the basis weight of the TPU coating was almost 40% lower than the 80 gsm PP/Co-PA film.

Example 9

Thermoplastic polyurethane (TPU) powder material (80 gsm) was powder coated onto composite boards including polypropylene and glass fibers. For each board basis weight, one board included an 80 gsm PP/CoPA film and the board with the TPU coating lacked the film. Two different board basis weights (800 gsm XL2™ core and 900 gsm Superlite™ core) were used for a total of four boards. Certain physical properties of the four boards were measured and compared. Each of the boards was placed in a heated thermoformer where a fabric (a bilaminate or bi lam fabric (PU/polyester) in this example) was added to the side of the board containing the TPU powder or the PP/Co-PA film. The composite was then molded to a thickness of 2.5 mm or 3.5 mm with the XL2™ core having a thickness of 3.5 mm and the Superlite™ core having a thickness of 2.5 mm.

Figure 18:
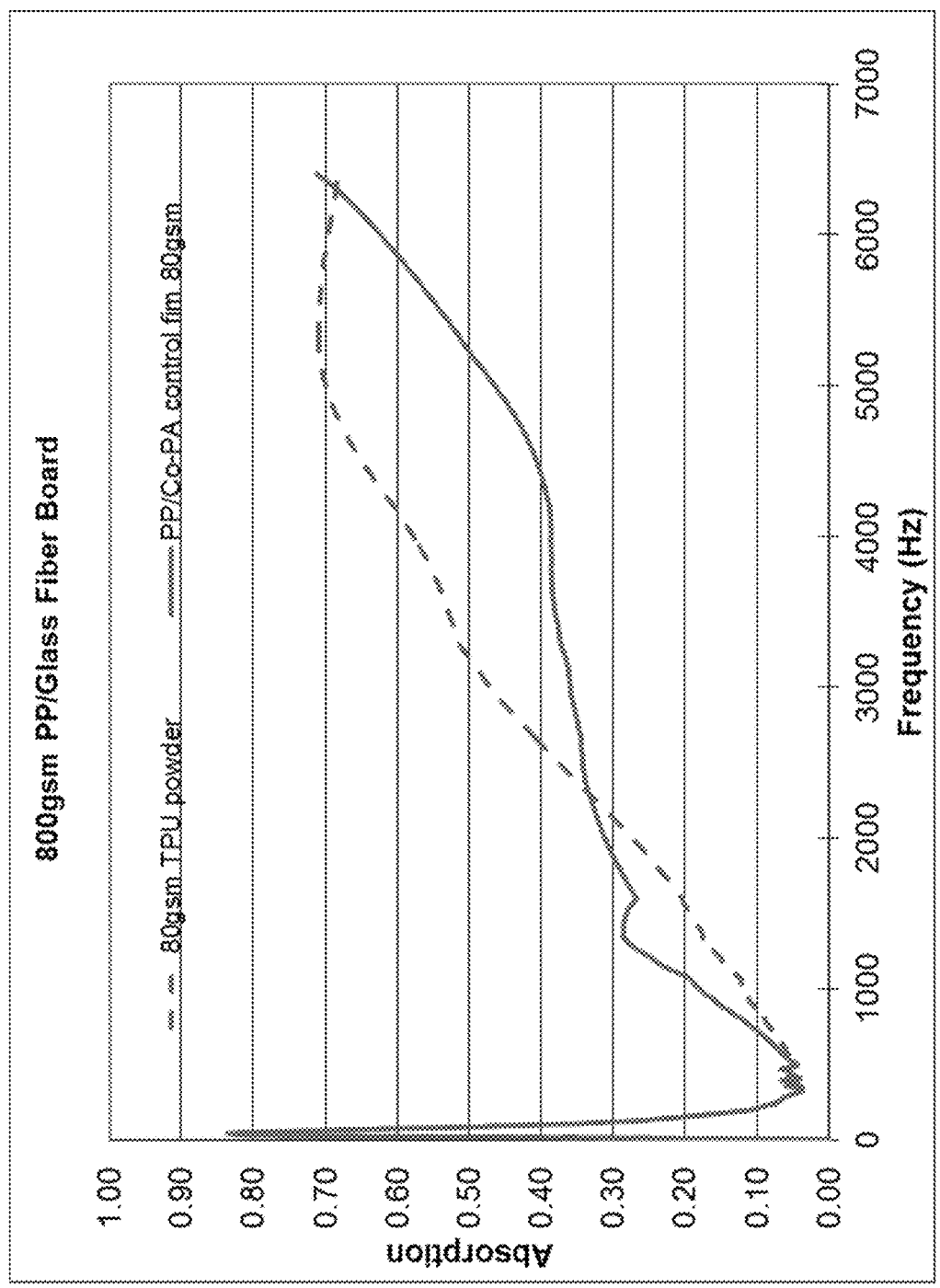
FIGS. 18, 19, 20, 21, 22, 23 and 24 are graphs showing sound absorption as a function of frequency for various composite articles.
Figure 19:
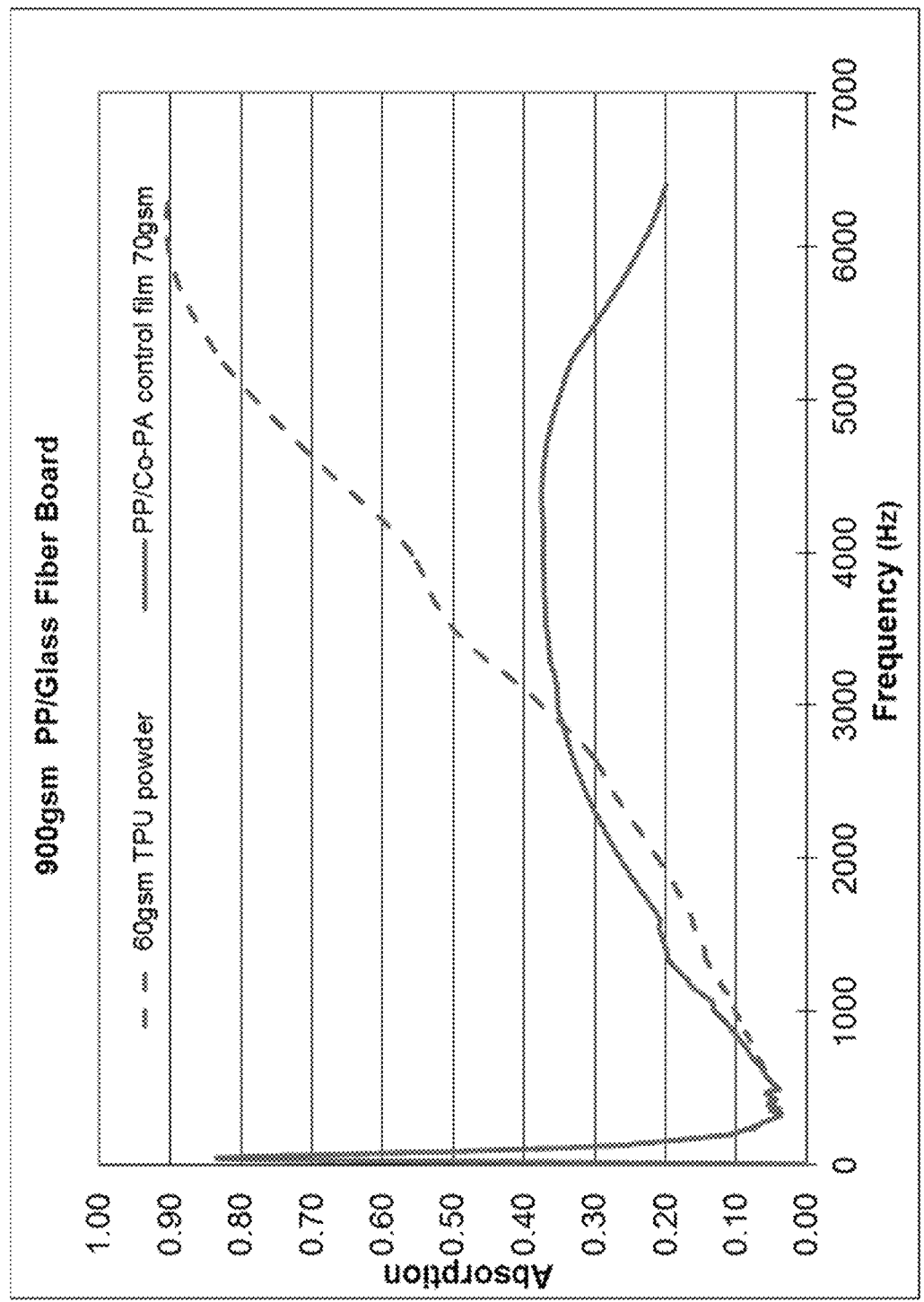

Acoustic absorption measurements as a function of frequency were measured from 0 Hz to 7000 Hz according to ASTM E1050 dated 2004 for the TPU coated boards the boards with the control film. FIG. 18 shows the results for the 800 gsm board using an XL2™ core (including polypropylene, glass fibers and microspheres), and FIG. 19 shows the results for the 900 gsm board using a Superlite™ core (including polypropylene and glass fibers) and 60 gsm TPU powder with and a 70 gsm PP/Co-PA film. The absorption measurements for the TPU powder coated board were higher when the frequency exceeds about 2500 Hz, and the absorption values are not substantially lower than the control film at values below 2500 Hz.

Figure 20:
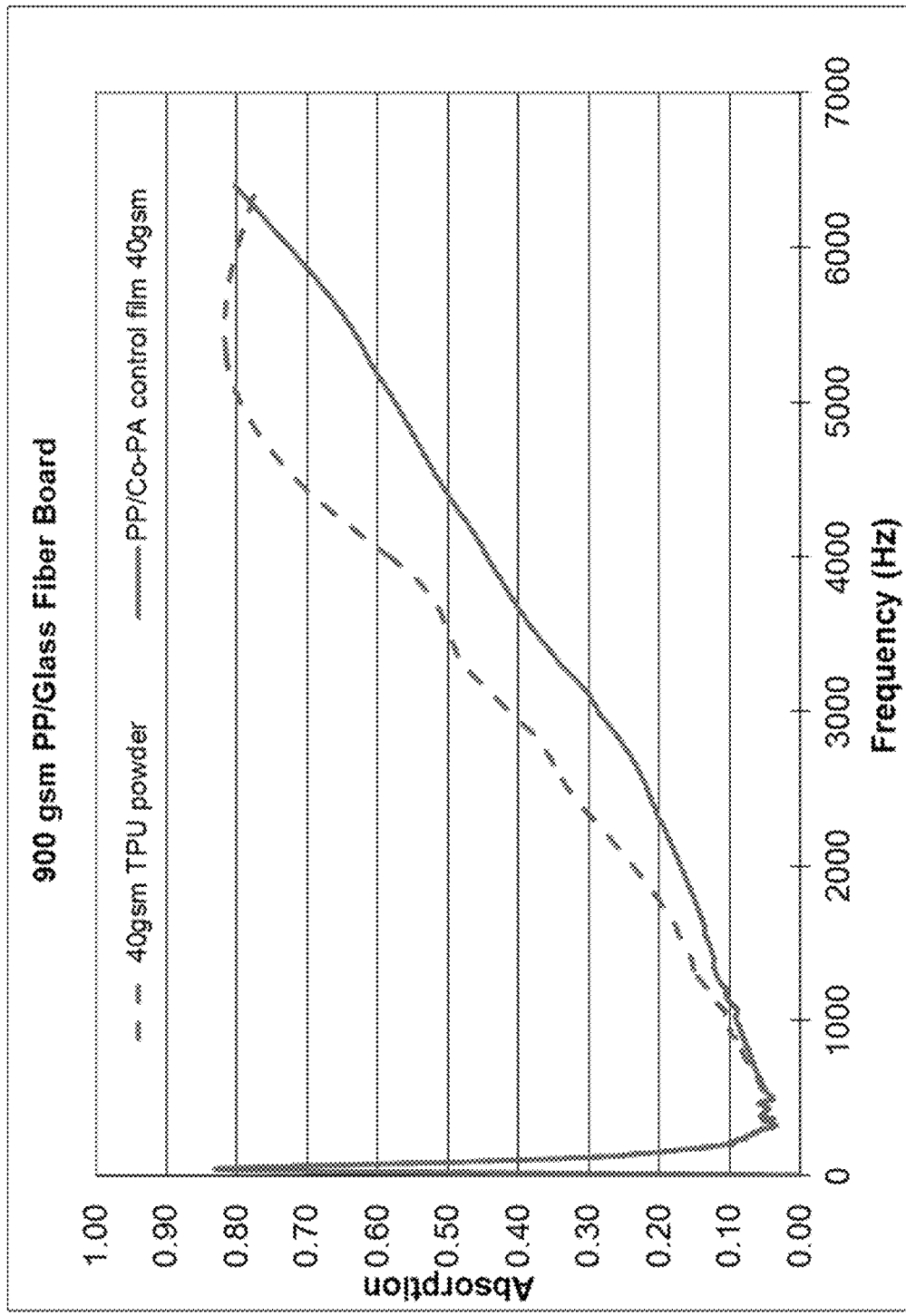

Additional boards were produced using the same materials (900 gsm board with a Superlite™ core) but using 40 gsm TPU powder with and a 40 gsm PP/Co-PA film. Acoustics measurements of these two boards were also measured. The results are shown in FIG. 20. At the lower TPU basis weight, the powder coated board still provided better acoustic absorption than the control film board and at an overall lower board weight. In addition, the acoustic absorption values at 40 gsm TPU were similar to those at 80 gsm TPU over a wide frequency range.

Example 10

Figure 21:
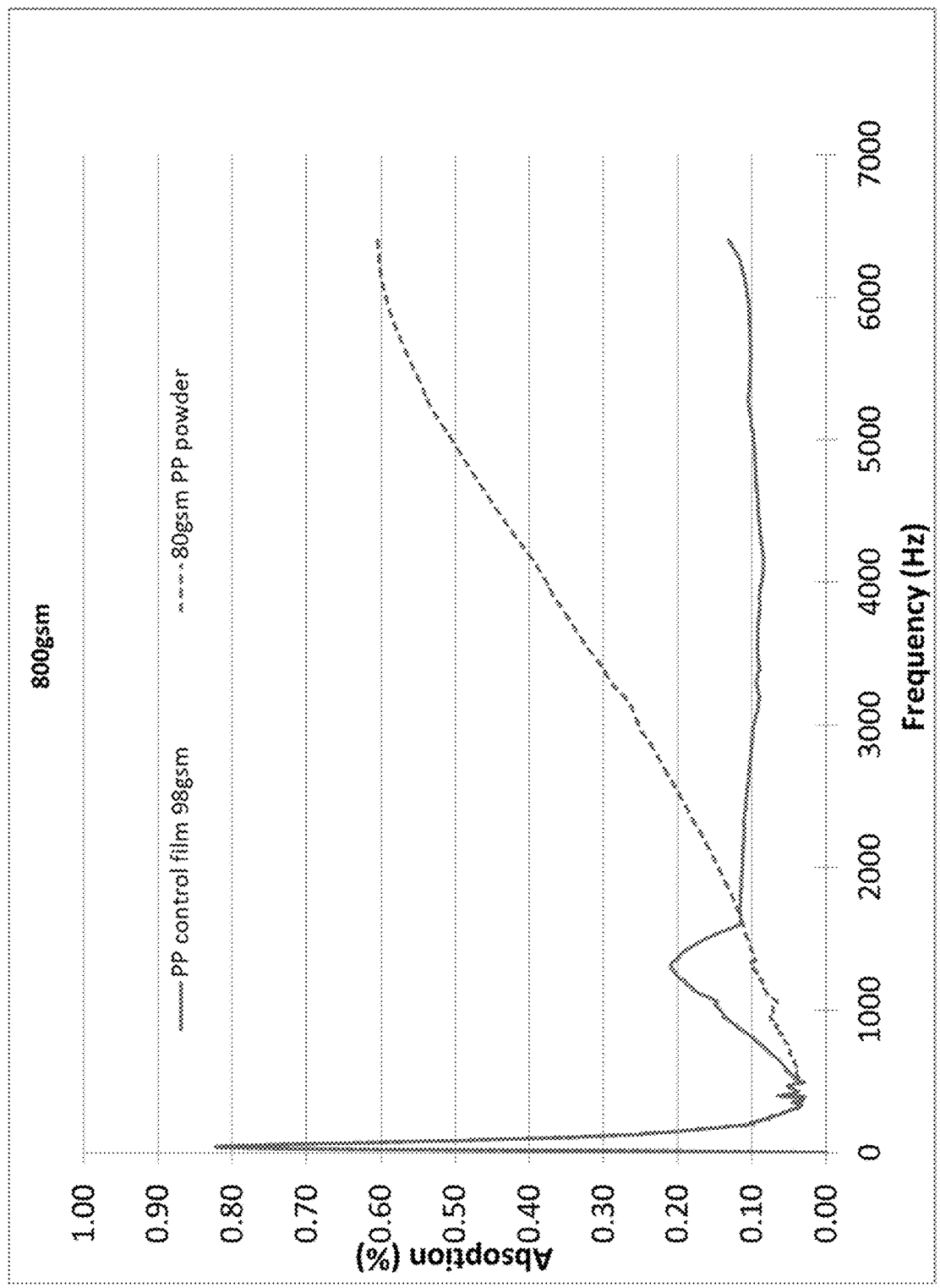
Figure 22:
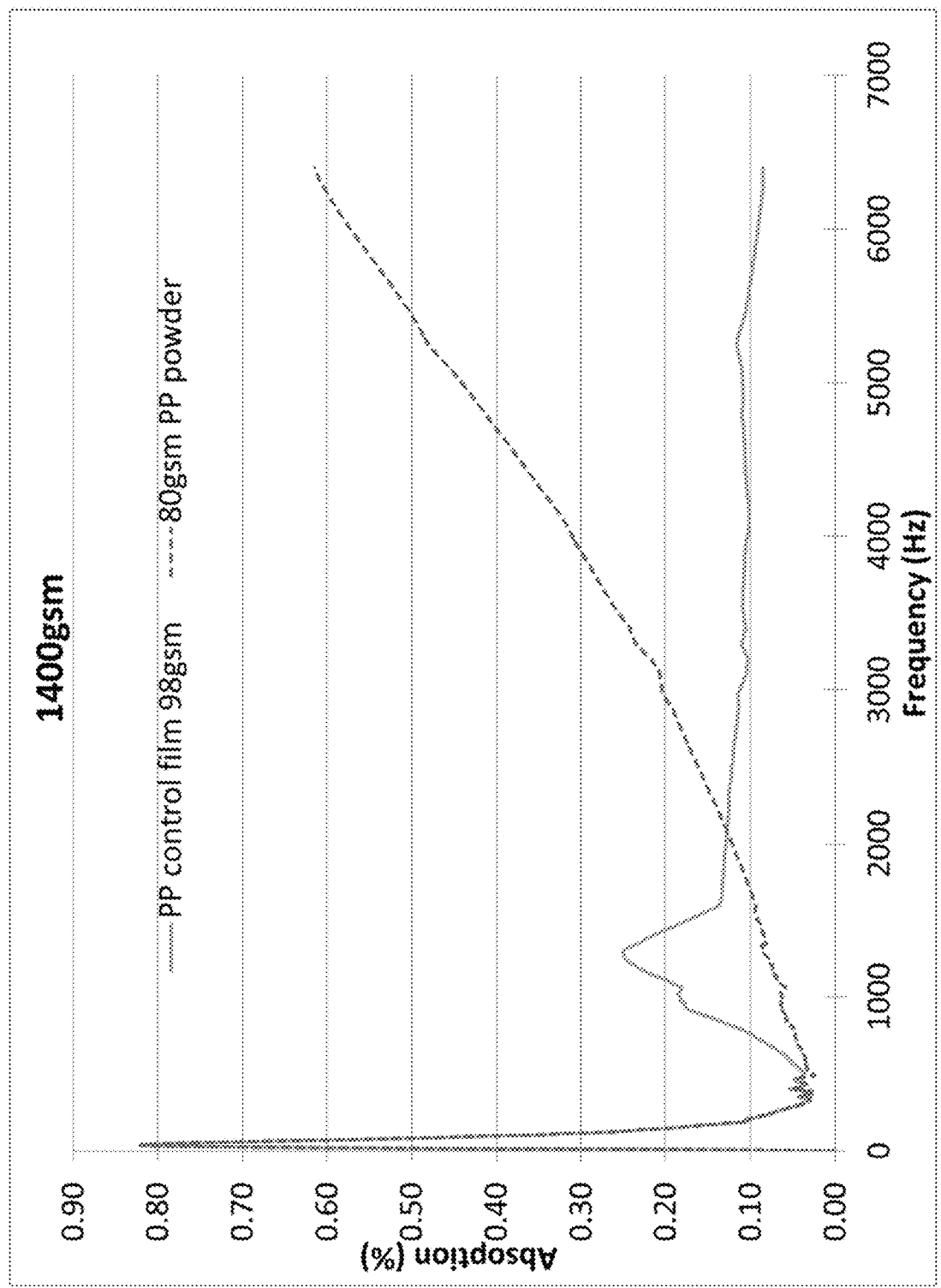
Figure 23:
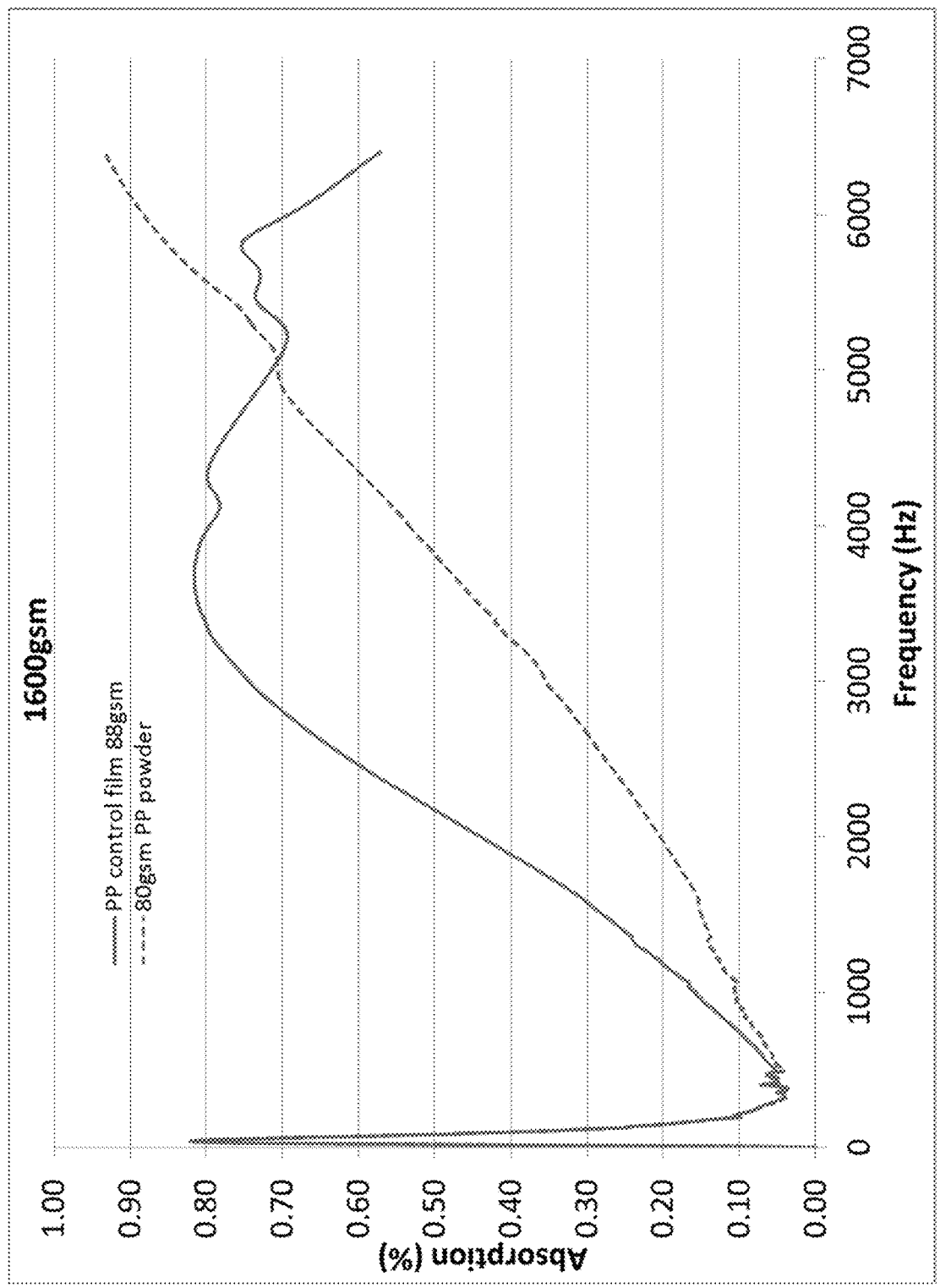
Figure 24:
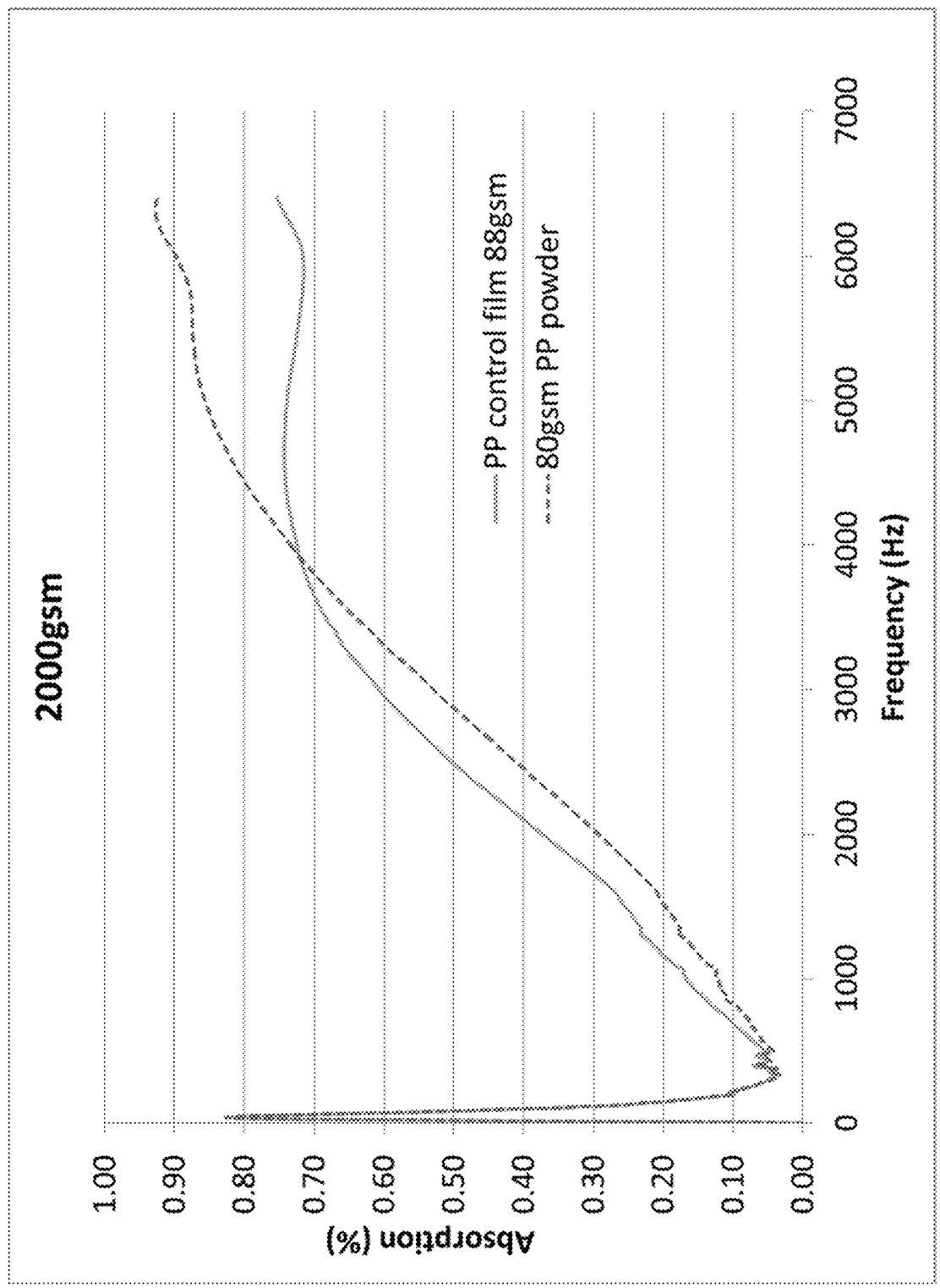

Powder coated PP boards of varying basis weights were produced using similar processes as the TPU coated boards of Example 9. The basis weights used were 800 gsm (XLT™ core including polypropylene, glass fibers and microspheres), 1400 gsm (Superlite™ core including polypropylene and glass fibers), 1600 gsm (Superlite™ core including polypropylene and glass fibers) and 2000 gsm (Superlite™ core including polypropylene and glass fibers). No cover layer was present on the PP powder coated boards in this example. Acoustic measurements of boards with 80 gsm PP powder were compared to boards with a 98 gsm solid PP film (FIGS. 21 and 22). Acoustic measurements of boards with 80 gsm PP powder were compared to boards with an 88 gsm perforated PP film (FIGS. 23 and 24). The results are shown graphically in FIGS. 21-24.

The 80 gsm PP powder coating provided higher absorption above 2000 Hz than the 98 gsm control solid PP film at both 800 gsm and 1400 gsm. The 80 gsm PP powder provided better absorption above 6000 Hz than the perforated PP control film at 1600 gsm. The absorption for the 2000 gsm board was about the same from 500 Hz to about 4500 Hz, and the absorption by the 80 gsm PP powder coating exceeded the 88 gsm perforated PP film above 4500 Hz. The results were consistent with being able to replace the PP film with a PP powder coat to provide similar or better acoustic properties over a wide basis weight range.

Example 11

Various physical parameters were tested on the boards of Example 9 including basis weight and ash (Table 10), peel testing at ambient temperature (Table 11), peel testing after environmental cycling at 90 degrees Celsius (Table 12), and air flow resistance (Table 13). The boards tested in Table 11 did not include any cover material and were tested as produced before any molding.

TABLE 10

| Sample | Basis Weight (gsm) | Ash (%) |
|---|---|---|
| XL2 ™ 800 gsm + PP/Co-PA control film 80 gsm | 897 | 39.0 |
| XL2 ™ 800 gsm + TPU powder 80 gsm | 897 | 39.0 |
| XL2 ™ 800 gsm + Co-PA powder 100 gsm | 917 | 38.2 |
| Superlite ™ 900 gsm + PP/Co-PA control film 70 gsm | 987 | 50.2 |
| Superlite ™ 900 gsm + TPU powder 60 gsm | 977 | 50.7 |
| Superlite ™ 900 gsm + co-PA powder 70 gsm | 987 | 50.2 |
| Superlite ™ 900 gsm + PP/Co-PA control film 40 gsm | 957 | 51.7 |
| Superlite ™ 900 gsm + TPU powder 40 gsm | 957 | 51.7 |
| Superlite ™ 900 gsm + Co-PA powder 50 gsm | 967 | 51.2 |

The basis weight and ash percentage of the XL2™ core samples were measured to be about the same. Similarly, the basis weight and ash percentage of the SL core samples were measured to be about the same. The boards tested in Tables 11 and 12 did include a bilaminate fabric (PU/polyester fabric) cover material.

TABLE 11

| Samples | Peel strength MD (N/m) | Peel strength CD (N/m) |
|---|---|---|
| XL2 ™ 800 gsm + PP/Co-PA control film 80 gsm | 526.5 | 506.3 |
| XL2 ™ 800 gsm + TPU powder 80 gsm | 512.8 | 539.9 |
| XL2 ™ 800 gsm + Co-PA powder 100 gsm | 435.1 | 436.2 |
| Superlite ™ 900 gsm + PP/Co-PA control film 70 gsm | 348.6 | 353.7 |
| Superlite ™ 900 gsm + TPU powder 60 gsm | 433.9 | 449.2 |
| Superlite ™ 900 gsm + Co-PA powder 70 gsm | 380.3 | 346.8 |
| Superlite ™ 900 gsm + PP/Co-PA control film 40 gsm | 366.9 | 434.5 |
| Superlite ™ 900 gsm + TPU powder 40 gsm | 375.2 | 400.7 |
| Superlite ™ 900 gsm + Co-PA powder 50 gsm | 236.1 | 255.3 |

Table 11 shows that the peel strength measurements at ambient temperature for the powder coated samples for the XL2™ 800 gsm boards had a reduced peel strength in the machine direction (MD) compared to the control film. The TPU powder coated sample had a larger peel strength in the cross direction (CD) than the control film.

The peel strength measurements for the Superlite™ 900 gsm samples show that the powder coated samples generally have a similar peel strength in the machine direction as the control film, and a similar or better peel strength in the cross direction compared to the peel strength of the control PP film. As powder basis weight increased, peel strength generally was observed to increase.

TABLE 12

| Samples | Peel strength MD (N/m) | Peel strength CD (N/m) |
|---|---|---|
| XL2 ™ 800 gsm + PP/Co-PA control film 80 gsm | 513.1 | 517.0 |
| XL2 ™ 800 gsm + TPU powder 80 gsm | 574.3 | 528.6 |
| XL2 ™ 800 gsm + Co-PA powder 100 gsm | 386.7 | 402.6 |
| Superlite ™ 900 gsm + PP/Co-PA control film 70 gsm | 287.4 | 345.2 |
| Superlite ™ 900 gsm + TPU powder 60 gsm | 433.0 | 366.3 |
| Superlite ™ 900 gsm + Co-PA powder 70 gsm | 333.3 | 295.8 |
| Superlite ™ 900 gsm + PP/Co-PA control film 40 gsm | 419.6 | 454.4 |
| Superlite ™ 900 gsm + TPU powder 40 gsm | 352.7 | 399.2 |
| Superlite ™ 900 gsm + Co-PA powder 50 gsm | 198.6 | 195.8 |

Table 12 shows that the peel strength measurements after heat aging for the powder coated samples for the XL2™ 800 gsm boards had a better peel strength (TPU powder) or reduced peel strength (Co-PA powder) in the machine direction (MD) compared to the control film. The TPU powder coated sample had a larger peel strength in the cross direction (CD) than the control film.

The peel strength measurements for the Superlite™ 900 gsm samples show that the powder coated samples generally have a similar peel strength in the machine direction as the control film, and a similar or better peel strength in the cross direction compared to the peel strength of the control PP film. As powder basis weight increased, peel strength generally was observed to increase. Compared to the ambient conditions, peel strength generally decreased after the environmental cycle for all boards.

TABLE 13

| Samples | Specific airflow resistance (Pa · s/m) |
|---|---|
| XL2 ™ 800 gsm + PP/Co-PA control film 80 gsm | 6569 |
| XL2 ™ 800 gsm + TPU powder 80 gsm | 1346 |
| XL2 ™ 800 gsm + Co-PA powder 100 gsm | 1854 |
| Superlite ™ 900 gsm + PP/Co-PA control film 70 gsm | 6555 |
| Superlite ™ 900 gsm + TPU powder 60 gsm | 856 |
| Superlite ™ 900 gsm + Co-PA powder 70 gsm | 1056 |
| Superlite ™ 900 gsm + PP/Co-PA control film 40 gsm | 930 |
| Superlite ™ 900 gsm + TPU powder 40 gsm | 825 |
| Superlite ™ 900 gsm + Co-PA powder 50 gsm | 726 |

The boards tested in Table 13 did include a bi lam cover material. The resistance to air flow was measured using a perpendicular flow through the board. More resistance to air flow correlates with a lower sound absorption. As can be seen from the results, the powder coated samples all had much lower airflow resistance indicating powder coating can provide better sound absorption than the control films.

Example 12

Peel strength measurements were performed on the various cores shown in Table 14. Table 14 shows the results for both ambient conditions and after heat aging. The boards tested in Table 14 did include a bi lam cover material.

TABLE 14

| Samples | Peel strength MD (N/m) | Peel strength CD (N/m) |
|---|---|---|
| *Ambient* | | |
| XLTB ™ 800 gsm + PP control film 98 gsm | COULD NOT BE PEELED | |
| XLTB ™ 800 gsm + PP powder 80 gsm | COULD NOT BE PEELED | |
| Superlite ™ 1400 gsm + PP control film 98 gsm | COULD NOT BE PEELED | |
| Superlite ™ 1400 gsm + PP powder 80 gsm | 1091.8 | 2179.1 |
| Superlite ™ 1600 gsm + PP control film 88 gsm | COULD NOT BE PEELED | |
| Superlite ™ 1600 gsm + PP powder 80 gsm | 1432.5 | 1903.8 |
| Superlite ™ 2000 gsm + PP control film 88 gsm | COULD NOT BE PEELED | |
| Superlite ™ 2000 gsm + PP powder 80 gsm | 1500.5 | 1585.2 |
| *After heat aging* | | |
| XLTB ™ 800 gsm + PP control film 98 gsm | COULD NOT BE PEELED | |
| XLTB ™ 800 gsm + PP powder 80 gsm | 1916.5 | 1762.2 |
| Superlite ™ 1400 gsm + PP control film 98 gsm | 2355.2 | 2545.6 |
| Superlite ™ 1400 gsm + PP powder 80 gsm | 2028.8 | 1664.3 |
| Superlite ™ 1600 gsm + PP film control 88 gsm | COULD NOT BE PEELED | |
| Superlite ™ 1600 gsm + PP powder 80 gsm | 1483.8 | 2195.0 |
| Superlite ™ 2000 gsm + PP control film 88 gsm | COULD NOT BE PEELED | |
| Superlite ™ 2000 gsm + PP powder 80 gsm | 1729.1 | 1915.1 |

For the ambient conditions, no peeling was possible for the 800 gsm XLT™ boards. Peeling was possible for the 1400 gsm, 1600 gsm and 2000 gsm Superlite™ (SL) boards which included the 80 gsm PP powder coating.

After heat aging, no peeling was possible for the 800 gsm XLT™ control film board but was possible for the 800 gsm XLT™ powder coated board. Peeling was possible for both 1400 gsm boards and only the powder coated 1600 gsm and 2000 gsm boards. These results are consistent with the PP powder coated boards providing high peel strength particularly at lower core basis weight.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A thermoplastic composite article comprising:
    a porous core layer comprising a web of reinforcing glass fibers held together by a polyolefin thermoplastic material, wherein the glass reinforcing fibers are present between 20% by weight and 80% by weight, wherein the polyolefin thermoplastic material is present between 20% by weight and 80% by weight, and wherein a porosity of the porous core layer is at least 10% by volume of the porous core layer, and wherein a basis weight of the porous core layer is about 300 gsm to about 3000 gsm;
    a powder coated layer comprising a thermoplastic polymeric powder disposed on the porous core layer, in which an average particle size of the thermoplastic polymeric powder is selected to provide an interface between the powder coated layer and the porous core layer, wherein substantially all of the disposed powder of the powder coated layer is present above the interface, wherein the thermoplastic polymeric powder is present in the powder coated layer from 50% by weight to 99% by weight, wherein the thermoplastic polymeric powder comprises a thermoplastic polyurethane powder or a co-polyamide powder or polypropylene powder, and wherein the powder coated layer comprises a basis weight of about 20 gsm to about 200 gsm; and
    a skin layer disposed on the powder coated layer, wherein the powder coated layer is effective to provide an average peel strength for the skin layer of at least 125 N/m in the machine direction and at least 125 N/m in the cross direction as tested by ASTM D903 Peel 180° dated 2010.

2. The thermoplastic composite article of claim 1, in which the porosity of the porous core layer is 50-95% by volume of the porous core layer.

3. The thermoplastic composite article of claim 1, in which the thermoplastic material of the porous core layer is the same as a polyolefin thermoplastic of the thermoplastic polymer powder of the powder coated layer.

4. The thermoplastic composite article of claim 3, in which the thermoplastic material of the porous core layer is a polypropylene and the thermoplastic polymeric powder is a is polypropylene.

5. The thermoplastic composite article of claim 1, in which the thermoplastic material of the porous core layer is selected from the group consisting of a polyethylene, a polypropylene and mixtures thereof.

6. The thermoplastic composite article of claim 1, in which the porous core layer further comprises a lofting agent.

7. The thermoplastic composite article of claim 1, in which no barrier is present between the porous core layer and the powder coated layer such that the powder coated layer is disposed directly on the porous core layer.

8. The thermoplastic composite article of claim 1, in which the skin layer is selected from the group consisting of a film, a frim, a scrim, a foil, a paper, a woven fabric, a non-woven fabric, a foam, an inorganic coating, an organic coating, a thermoplastic coating and a thermosetting material coating.

9. The thermoplastic composite article of claim 1, further comprising a decorative layer disposed on the skin layer.

10. The thermoplastic composite article of claim 1, in which the porous core layer further comprises a thermoplastic material different from a thermoplastic material in the powder coated layer.

11. The thermoplastic composite article of claim 1, in which the powder coated layer is effective to provide an average peel strength for the skin layer of at least 390 N/m in the machine direction and at least 390 N/m in the cross direction as tested by ASTM D903 Peel 180° dated 2010.

12. The thermoplastic composite article of claim 1, in which the powder coated layer is effective to provide an average peel strength for the skin layer of at least 250 N/m in the machine direction and at least 250 N/m in the cross direction as tested by ASTM D903 Peel 180° dated 2010.

13. The thermoplastic composite article of claim 1, wherein the porous core layer comprises polypropylene and the skin layer comprises a fabric layer.

14. The thermoplastic composite article of claim 1, wherein the porous core layer comprises polypropylene, the powder coated layer comprises polypropylene powder, and the skin layer comprises a fabric layer.

15. The thermoplastic composite article of claim 1, wherein the porous core layer comprises polypropylene, the powder coated layer comprises a co-polyamide powder, and the skin layer comprises a fabric layer or a film.

* * * * *